United States Patent
Guim Bernat et al.

(10) Patent No.: US 10,038,767 B2
(45) Date of Patent: Jul. 31, 2018

(54) TECHNOLOGIES FOR FABRIC SUPPORTED SEQUENCERS IN DISTRIBUTED ARCHITECTURES

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Raj K. Ramanujan, Federal Way, WA (US); Daniel Rivas Barragan, Cologne (DE)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 15/260,613

(22) Filed: Sep. 9, 2016

(65) Prior Publication Data

US 2018/0077270 A1    Mar. 15, 2018

(51) Int. Cl.
  *H04L 12/50* (2006.01)
  *H04L 29/08* (2006.01)
  *H04L 1/16* (2006.01)

(52) U.S. Cl.
  CPC .......... *H04L 69/324* (2013.01); *H04L 1/1642* (2013.01); *H04L 12/50* (2013.01)

(58) Field of Classification Search
  CPC ...... H04L 69/324; H04L 1/1642; H04L 12/50
  See application file for complete search history.

(56) References Cited

U.S. PATENT DOCUMENTS

| | | | | |
|---|---|---|---|---|
| 6,493,343 | B1 * | 12/2002 | Garcia | G06F 12/0292 370/394 |
| 7,158,520 | B1 * | 1/2007 | Sindhu | H04L 45/60 370/352 |
| 8,140,731 | B2 * | 3/2012 | Arimilli | G06F 15/16 709/217 |

* cited by examiner

Primary Examiner — Afshawn M Towfighi
(74) Attorney, Agent, or Firm — Barnes & Thornburg LLP

(57) ABSTRACT

Technologies for using fabric supported sequencers in fabric architectures includes a network switch communicatively coupled to a plurality of computing nodes. The network switch is configured to receive an sequencer access message from one of the plurality of computing nodes that includes an identifier of a sequencing counter corresponding to a sequencer session and one or more operation parameters. The network switch is additionally configured to perform an operation on a value associated with the identifier of the sequencing counter as a function of the one or more operation parameters, increment the identifier of the sequencing counter, and associate a result of the operation with the incremented identifier of the sequencing counter. The network switch is further configured to transmit an acknowledgment of successful access to the computing node that includes the result of the operation and the incremented identifier of the sequencing counter. Other embodiments are described herein.

25 Claims, 9 Drawing Sheets

TECHNOLOGIES FOR FABRIC SUPPORTED SEQUENCERS IN DISTRIBUTED ARCHITECTURES

BACKGROUND

Demands by individuals, researchers, and enterprises for increased compute performance and storage capacity of computing devices have resulted in various computing technologies developed to address those demands. For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of multi-processor/multi-core network nodes connected via high-speed interconnects (e.g., fabric interconnects in a unified fabric).

To carry out such processor intensive computations, various computing technologies have been implemented to distribute workloads across different network computing devices, such as parallel computing, distributed computing, etc. In support of such distributed workload operations, multiprocessor hardware architecture (e.g., multiple multi-core processors that share memory) has been developed to facilitate multiprocessing (i.e., coordinated, simultaneous processing by more than one processor) across local and remote shared memory systems using various parallel computer memory design architectures, such as non-uniform memory access (NUMA), and other distributed memory architectures.

As a result of the distributed computing architectures, information for a given application can be stored across multiple interconnected computing nodes. As such, retrieving the distributed information is often performed by broadcasting request messages via multicast techniques (e.g., one-to-many or many-to-many message distribution) capable of sending messages addressed to a group of target computing devices simultaneously. However, as distributed systems grow in size and scale, bandwidth and hardware (e.g., memory, processing power, etc.) availability can become strained.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
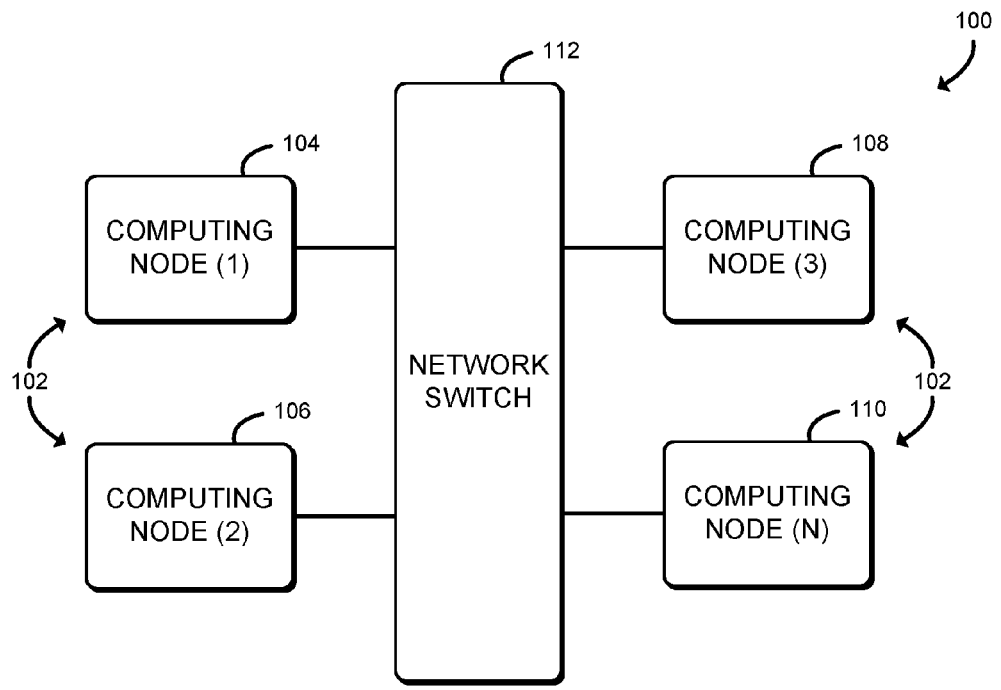
FIG. 1 is a simplified block diagram of at least one embodiment of a system for using fabric supported sequencers in distributed architectures that includes multiple computing nodes communicatively coupled via a network switch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for using fabric supported sequencers in distributed architectures includes multiple computing nodes 102 communicatively coupled via a series of fabric interconnects to a network switch 112. The illustrative computing nodes 102 include a first computing node, which is designated as computing node (1) 104, a second computing node, which is designated as computing node (2) 106, a third computing node, which is designated as computing node (3) 108, and a fourth computing node, which is designated as computing node (N) 110 (i.e., the "Nth" computing node of the computing nodes 102, wherein "N" is a positive integer and designates one or more additional computing nodes 102). It should be appreciated that, in other embodiments, there may be any number of computing nodes 102 (e.g., client computing nodes, storage computing nodes, etc.) coupled to the illustrative network switch 112 or another network switch 112 in the system 100. Accordingly, there may be multiple network switches 112 in other embodiments. It should be further appreciated that, in such embodiments, multiple network switches 112 may be connected, or daisy chained, to each other.

In use, the network switch 112 receives a message (i.e., a sequencer creation message) from one of the computing nodes via a host fabric interface (HFI) of that computing node 102 that requests a sequencing counter be assigned or otherwise allocated to that computing node 102. It should be appreciated that the one of the computing nodes 102 initiating the initialization of the sequencer (i.e., via the sequencer creation message) is referred to herein as the "master" computing node (see, e.g., the master computing node 604 of FIGS. 6-8). The network switch 112, upon receiving the sequencer creation message from the master computing node, assigns an available (i.e., not presently assigned) sequencing counter to the master computing node and transmits an acknowledgment message to the master computing node indicating the successful assignment of the sequencing counter by including an identifier of the assigned sequencing counter (i.e., a sequencing counter ID).

Subsequently, the master computing node, or another one of the computing nodes 102 to which the sequencing counter ID has been indicated (i.e., in a sequencer group), may access the sequencing counter associated with the sequencing counter ID by generating a sequencer access message that includes sequencer session data, such as an identifier of a target network switch on which the sequencing counter resides (i.e., a target network switch ID), the sequencing counter ID. The sequencer access message additionally includes one or more operation parameters including an operation indicator (e.g., a mathematical symbol, a mutator method, etc.) and/or an operand value. Upon receiving the sequencer access message and verification that the target network switch ID matches the identifier of the network switch 112, the network switch 112 performs an operation based on a present value associated with the sequencing counter ID, the operation indicator, and the operand value. The network switch 112 then increments sequencing counter ID and associated the result of that operation with the incremented sequencing counter ID.

Additionally, the network switch 112 transmits an acknowledgment to the master computing node. The acknowledgment may include the result of the performed operation and/or the incremented sequencing counter ID. Such operations may be performed until the master computing node deletes, or otherwise frees, the associated sequencing counter ID. Accordingly, unlike present technologies (e.g., sequencer solutions in a user-space application running over TCP-IP to centralized servers in which the sequencer server can become the bottleneck), the remote atomic operations may provide lower latency, as congestion in the link connecting the sequencer server of present technologies to the network switch 112 is removed (i.e., by removing hops related to the communications over the link). Further, the bandwidth pressure in virtual channels related to the sequencer flows described herein may be divided by the number of computing node 102 ports connected to the network switch 112, thereby reducing latency as compared to present technologies. It should be appreciated that while the sequencer flows described herein are illustrated in scale out database architectures, the sequencer flows may be extended beyond the network switch 112, such as with per-switch service-level agreements (SLAs), for example.

The computing nodes 102 may be embodied as any type of compute and/or storage device that is capable of performing the functions described herein, such as, without limitation, a server (e.g., stand-alone, rack-mounted, blade, etc.), a network appliance (e.g., physical or virtual), a web appliance, a distributed computing system, and/or a multiprocessor-based system. As described previously, the computing nodes 102 may be embodied as compute nodes and/or storage nodes. Accordingly, it should be appreciated that those computing nodes 102 implemented as storage nodes may generally include more data storage capacity than those computing nodes 102 that are embodied as compute nodes.

Similarly, it should also be appreciated that those computing nodes 102 implemented as compute nodes may generally include more processor capability that those computing nodes 102 implemented as storage nodes. In other words, the storage nodes may be embodied as physical servers including numerous hard-disk drives (HDDs) or solid-state drives (SDDs) relative to the number of storage devices of the compute nodes, whereas the compute nodes may be embodied as physical servers including numerous processors having multiple cores relative to the number of processors of the storage nodes. However, it should be further appreciated that any of the computing nodes 102 may be implemented as a compute node and/or a storage node, regardless of the component configuration relative to the other computing nodes 102. Further, it should be appreciated that the computing nodes 102 may include additional and/or alternative computing nodes, such as controller nodes, network nodes, utility nodes, etc., which are not shown to preserve clarity of the description.

Figure 2:
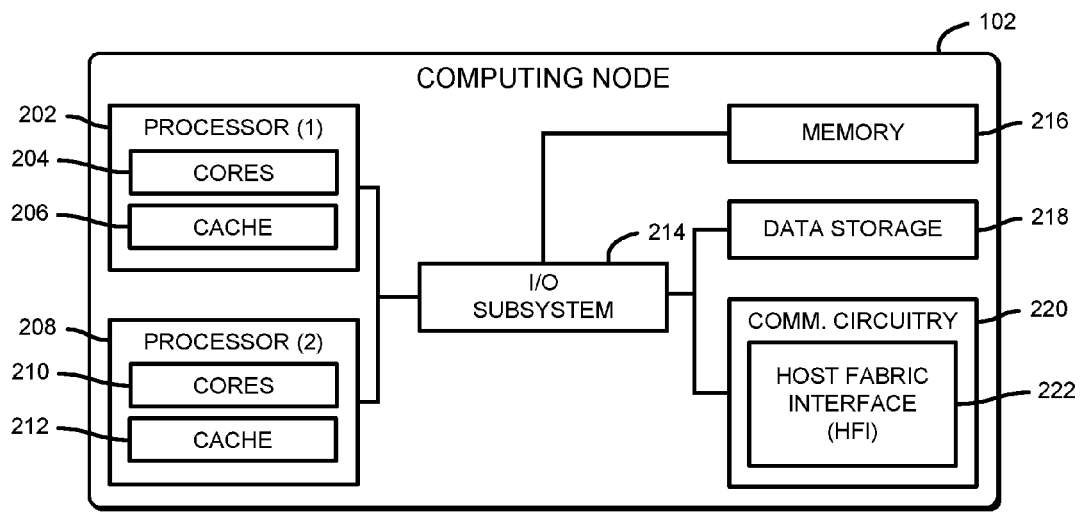
FIG. 2 is a simplified block diagram of at least one embodiment of one of the computing nodes of the system of FIG. 1.

As shown in FIG. 2, an illustrative computing node 102 includes a first processor, designated as processor (1) 202, a second processor, designated as processor (2) 208, an input/output (I/O) subsystem 214, a main memory 216, a data storage device 218, and communication circuitry 220. Of course, it should be appreciated that one or more of the computing nodes 102 may include other or additional components, such as those commonly found in a computing device (e.g., peripheral devices, other processing/storage hardware, etc.), in other embodiments. Additionally, in some embodiments, one or more of the illustrative components may be incorporated in, or otherwise form a portion of, another component. For example, cache memory of the computing node 102 (e.g., cache memory 206, 212), or portions thereof, may be incorporated in one or both of the processors 202, 208 in some embodiments. Further, in some embodiments, one or more of the illustrative components may be omitted from the computing node 102. For example, although the illustrative computing node 102 includes two processors 202, 208, the computing node 102 may include a greater number of processors in other embodiments.

Each of the processors 202, 208 (i.e., physical processor packages) may be embodied as any type of multi-core processor capable of performing the functions described herein, such as, but not limited to, a single physical multi-processor core chip, or package. The illustrative processor (1) 202 includes a number of processor cores 204, while the illustrative processor (2) 208 similarly includes a number of processor cores 210. As described previously, each of the processors 202, 208 includes more than one processor core (e.g., 2 processors cores, 4 processors cores, 8 processors cores, 16 processors cores, etc.).

Each of processor cores 204, 210 is embodied as an independent logical execution unit capable of executing programmed instructions. In some embodiments, the processor cores 204, 210 may include a portion of cache memory (e.g., an L1 cache) and functional units usable to independently execute programs or threads. It should be appreciated that, in some embodiments of the computing node 102 (e.g., supercomputers), the computing node 102 may include thousands of processor cores. Each of the processors 202, 208 may be connected to a physical connector, or socket, on a motherboard (not shown) of the computing node 102 that is configured to accept a single physical processor package (i.e., a multi-core physical integrated circuit).

The illustrative processor (1) 202 additionally includes a cache memory 206 and the illustrative processor (2) 208 includes a cache memory 212. Each cache memory 206, 212 may be embodied as any type of cache that the respective processor 202, 208 can access more quickly than the main memory 216, such as an on-die or on-processor cache. In other embodiments, the cache memory 206, 212 may be an off-die cache, but reside on the same system-on-a-chip (SoC) as the respective processor 202, 208. It should be appreciated that, in some embodiments, the cache memory 206, 212 may have a multi-level architecture. In other words, in such multi-level architecture embodiments, the cache memory 206, 212 may be embodied as one or more of an L1, L2, or L3 cache, for example.

The main memory 216 may be embodied as any type of volatile or non-volatile memory or data storage device capable of performing the functions described herein. In operation, the main memory 216 may store various data and software used during operation of the computing node 102, such as operating systems, applications, programs, libraries, and drivers. The main memory 216 is communicatively coupled to the processors 202, 208 via the I/O subsystem 214, which may be embodied as circuitry and/or components to facilitate input/output operations with the processors 202, 208, the main memory 216, and other components of the computing node 102. For example, the I/O subsystem 214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 214 may form a portion of a SoC and be incorporated, along with one or both of the processors 202, 208, the main memory 216, and/or other components of the computing node 102, on a single integrated circuit chip.

The data storage device 218 may be embodied as any type of device or devices configured for short-term or long-term storage of data such as, for example, memory devices and circuits, memory cards, hard disk drives, solid-state drives, or other data storage devices. It should be appreciated that the data storage device 218 and/or the main memory 216 (e.g., the computer-readable storage media) may store various data as described herein, including operating systems, applications, programs, libraries, drivers, instructions, etc., capable of being executed by a processor (e.g., the processor 202, the processor 208, etc.) of the computing node 102.

The communication circuitry 220 may be embodied as any communication circuit, device, or collection thereof, capable of enabling wireless and/or wired communications between the computing node 102 and other computing devices (e.g., another one of the computing nodes 102, the network switch 112, etc.). The communication circuitry 220 may be configured to use one or more communication technologies (e.g., wireless or wired communication technologies) and associated protocols (e.g., Internet Protocol (IP), Ethernet, Bluetooth®, Wi-Fi®, WiMAX, LTE, 5G, etc.) to effect such communication.

The illustrative communication circuitry 220 includes a host fabric interface (HFI) 222. The HFI 222 may be embodied as one or more add-in-boards, daughtercards, network interface cards, controller chips, chipsets, or other devices that may be used by the computing node 102. For example, in some embodiments, the HFI 222 may be integrated with one or both of the processors 202, 208 (e.g., on a coherent fabric within one or both of the processors 202, 208), embodied as an expansion card coupled to the I/O subsystem 214 over an expansion bus (e.g., PCI Express (PCIe)), part of a SoC that includes one or more processors, or included on a multichip package that also contains one or more processors. Additionally or alternatively, in some embodiments, functionality of the HFI 222 may be integrated into one or more components of the computing node 102 at the board level, socket level, chip level, and/or other levels. The HFI 222 is configured to facilitate the transfer of data/messages to enable tasks executing on the processors 202, 208 to access shared structures (e.g., shared physical memory) of the other computing nodes 102, such as may be necessary during parallel or distributed computing operations as described herein.

Referring again to FIG. 1, the network switch 112 may be embodied as any type of switching device (e.g., a crossbar switch) capable of forwarding network traffic through the fabric (e.g., via fabric interconnects) in a switched, or switching, fabric architecture, such as a switch (e.g., rack-mounted, standalone, fully managed, partially managed, full-duplex, and/or half-duplex communication mode enabled, etc.), a router, etc. As described previously, the network switch 112 relies on fabric interconnects to communicatively couple the network switch 112 to a number of respective computing nodes 102. The fabric interconnects may be embodied as one or more buses, switches, and/or networks configured to support transmission of network traffic as a function of various interconnect protocols and/or network protocols. In use, the fabric interconnects are utilized by the computing nodes 102 (e.g., via respective HFIs 222) to communicate with the network switch 112 and the other computing nodes 102 (i.e., across the interconnect fabric).

Figure 3:
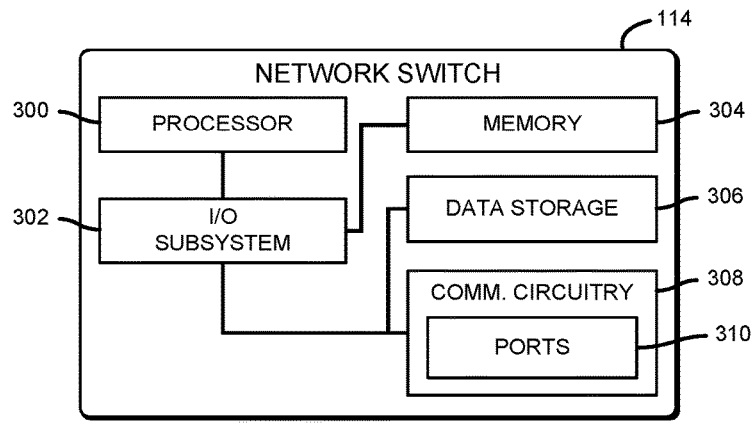
FIG. 3 is a simplified block diagram of at least one embodiment of the network switch of the system of FIG. 1.

As shown in FIG. 3, similar to the illustrative computing node 102 of FIG. 2, an illustrative network switch 112 includes a processor 300, an I/O subsystem 302, a memory 304, a data storage device 306, and communication circuitry 308. As such, further descriptions of the like components are not repeated herein with the understanding that the description of the corresponding components provided above in regard to the illustrative computing node 102 of FIG. 2 applies equally to the corresponding components of the network switch 112 of FIG. 3. Of course, it should be appreciated that the network switch 112 may include other or additional components, such as those commonly found in a network traffic switching device (e.g., peripheral devices, other processing/storage hardware, etc.), in other embodiments. Additionally, in some embodiments, one or more of the illustrative components may be incorporated in, or otherwise form a portion of, another component. Further, in some embodiments, one or more of the illustrative components may be omitted from the network switch 112.

The illustrative communication circuitry 308 includes multiple switch ports 310 (i.e., input/output ports) for transmitting and receiving data to/from the network switch 112. Accordingly, in some embodiments, the network switch 112 may be configured to create a separate collision domain for each of the switch ports 310. As such, depending on the network design of the network switch 112 and the operation mode (e.g., half-duplex, full-duplex, etc.), it should be appreciated that each of the computing nodes 102 connected to one of the switch ports 310 of the network switch 112 may be configured to transfer data to any of the other computing nodes 102 at any given time, and the transmissions should not interfere, or collide.

Figure 4:
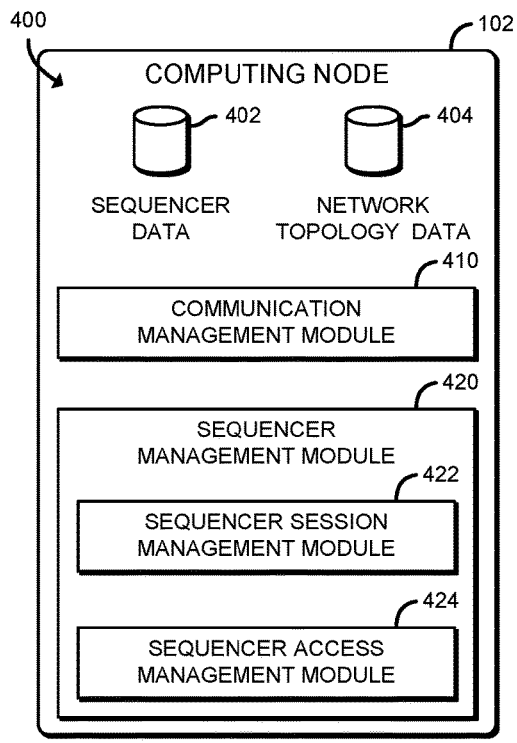
FIG. 4 is a simplified block diagram of at least one embodiment of an environment that may be established by the computing node of FIG. 2.

Referring now to FIG. 4, in an illustrative embodiment, one of the computing nodes 102 establishes an environment 400 during operation. The illustrative environment 400 includes a communication management module 410 and a sequencer management module 420. The various modules of the environment 400 may be embodied as hardware, firmware, software, or a combination thereof. As such, in some embodiments, one or more of the modules of the environment 400 may be embodied as circuitry or collection of electrical devices (e.g., a communication management circuit 410, a sequencer management circuit 420, etc.).

It should be appreciated that, in such embodiments, one or more of the communication management circuit 410 and the sequencer management circuit 420 may form a portion of one or more of the processors 202, 208, the I/O subsystem 214, the communication circuitry 220 (e.g., the HFI 222), and/or other components of the computing node 102. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the one or more processors and/or other components of the computing node 102.

In the illustrative environment 400, the computing node 102 further includes sequencer data 402 and network topology data 404, each of which may be stored in the main memory 216, the data storage device 218, and/or another data storage medium (e.g., a local memory (not shown) of the HFI 222) of the computing node 102. Further, each of the sequencer data 402 and the network topology data 404 may be accessed by the various modules and/or sub-modules of the computing node 102. Additionally, it should be appreciated that in some embodiments the data stored in, or otherwise represented by, each of the sequencer data 402 and the network topology data 404 may not be mutually exclusive relative to each other.

For example, in some implementations, data stored in the sequencer data 402 may also be stored as a portion of the network topology data 404, and/or vice versa. As such, although the various data utilized by the computing node 102 is described herein as particular discrete data, such data may be combined, aggregated, and/or otherwise form portions of a single or multiple data sets, including duplicative copies, in other embodiments. It should be further appreciated that the computing node 102 may include additional and/or alternative components, sub-components, modules, sub-modules, and/or devices commonly found in a computing device, which are not illustrated in FIG. 4 for clarity of the description.

The communication management module 410, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the computing node 102. To do so, the communication management module 410 is configured to receive and process network packets from network computing devices (e.g., other computing nodes 102, network switches 112, etc.) communicatively coupled to the computing node 102 (e.g., via fabric interconnects). Additionally, the communication management module 410 is configured to prepare and transmit network packets to network computing devices (e.g., other computing nodes 102, network switches 112, etc.) communicatively coupled to the computing node 102 (e.g., via fabric interconnects).

The sequencer management module 420, which may be embodied as hardware, firmware, software, virtualized hardware, emulated architecture, and/or a combination thereof as discussed above, is configured to manage the sequencers either initiated by the computing node 102 or associated with the computing node 102 (e.g., in a sequencer group). To do so, the illustrative sequencer management module 420 includes a sequencer session management module 422 and a sequencer access management module 424. It should be appreciated that each of the sequencer session management module 422 and the sequencer access management module 424 of the sequencer management module 420 may be separately embodied as hardware, firmware, software, virtualized hardware, emulated architecture, and/or a combination thereof. For example, sequencer session management module 422 may be embodied as a hardware component, while the sequencer access management module 424 may be embodied as a virtualized hardware component or as some other combination of hardware, firmware, software, virtualized hardware, emulated architecture, and/or a combination thereof.

The sequencer session management module 422 is configured to manage sequencer creation and deletion. To do so, for those sequencer sessions for which the computing node 102 is operating as the operate as the master computing node, the sequencer session management module 422 is configured to generate sequencer creation and deletion messages usable by the target network switch to assign and free corresponding sequencing counters of an associated sequencer session, and transmit the generated messaged to a target network switch. Accordingly, the sequencer session management module 422 is configured to access one or more previously identified network switch identifiers for the target network switches configured to act as sequencers (i.e., manage the sequencer sessions). The network switch identifiers may include any type of data usable to uniquely identify the network switch 112, such as an internet protocol (IP) address, a media access control (MAC) address, etc. In some embodiments, the network switch identifiers may be stored in the network topology data 404.

The sequencer session management module 422 is further configured to manage identifiers of sequencing counters (i.e., sequencing counter IDs) which have been assigned to the computing node 102 (i.e., acting as a master computing node) by the target network switch. As will be described in further detail below, the sequencer session management module 422 is additionally configured to receive the sequencing counter IDs in an acknowledgment message from the target network switch indicating successful creation of a sequencer session (i.e., assignment of corresponding sequencing counter IDs) requested by the computing node 102. In some embodiments, the sequencing counter IDs may be stored in the sequencer data 402.

Additionally, the sequencer session management module 422 is configured to manage sequencer group notifications, such as upon creation and/or deletion of a sequencer session. To do so, the sequencer session management module 422 is configured to generate and transmit a sequencer group notification message to the target network switch that is usable by the target network switch to broadcast (e.g., via unicast transmissions) the notification to those other computing nodes 102 identified by the sequencer session management module 422 as being included in the sequencer group, thereby allowing the other computing nodes 102 in the sequencer group access to the sequencing counter of a particular sequencer session. Accordingly, the sequencer session management module 422 is configured to access previously identified computing node identifiers for the other computing nodes 102 of the interconnect fabric. The computing node identifiers may include any type of data usable to uniquely identify the other computing nodes 102, such as an internet protocol (IP) address, a media access control (MAC) address, etc. In some embodiments, the computing node identifiers may be stored in the network topology data 404.

The sequencer access management module 424 is configured to manage accesses to the sequencing counters of presently open sequencer sessions. It should be appreciated that the sequencer access management module 424 is configured to manage accesses to those sequencing counters for which the computing node 102 is responsible for managing (i.e., operating as a master computing node) or those sequencing counters associated with a sequencer group to which the computing node 102 has been included. To manage the sequencing counter accesses, the sequencer access management module 424 is configured to generate and transmit sequencer access messages with sequencer session data (e.g., a target network switch identifier, a sequencing counter ID, etc.) and one or more operation parameters. The operation parameters may include any data usable to perform an operation on a value associated with a corresponding sequencing counter, such as an operation indicator (e.g., a mathematical symbol, a mutator method, etc.) and/or an operand value. Further, to manage the sequencing counter accesses, the sequencer access management module 424 is additionally configured to receive an acknowledgment from the target network switch with results of the operation associated with the operation parameters.

Figure 5:
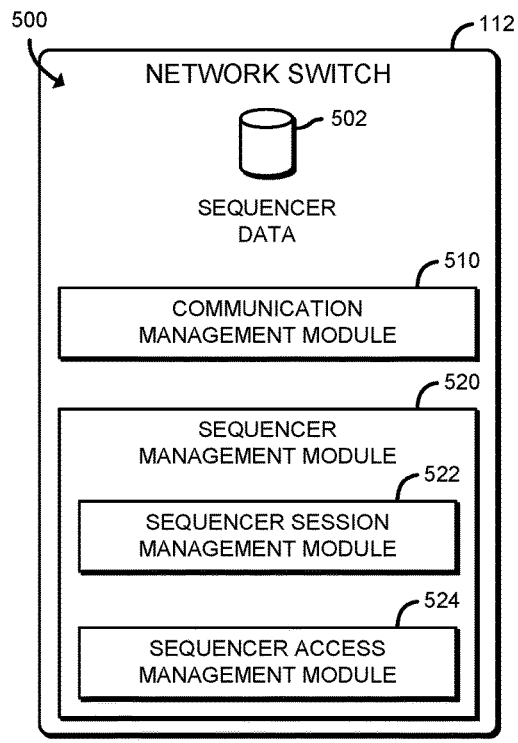
FIG. 5 is a simplified block diagram of at least one embodiment of an environment that may be established by the network switch of FIG. 3.

Referring now to FIG. 5, in an illustrative embodiment, the network switch 112 establishes an environment 500 during operation. Similar to the illustrative environment 400 of FIG. 4, the illustrative environment 500 includes a communication management module 510 and a sequencer management module 520. The various modules of the environment 500 may be embodied as hardware, firmware, software, or a combination thereof. As such, in some embodiments, one or more of the modules of the environment 500 may be embodied as circuitry or collection of electrical devices (e.g., a communication management circuit 510, a sequencer management circuit 520, etc.).

It should be appreciated that, in such embodiments, one or both of the communication management circuit 510 and the sequencer management circuit 520 may form a portion of the processor 300, the I/O subsystem 302, the communication circuitry 308, and/or other components of the network switch 112. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture, which may be established and maintained by the one or more processors and/or other components of the network switch 112.

In the illustrative environment 500, the network switch 112 further includes sequencer data 502, which may be stored in the main memory 304, the data storage device 306, and/or another data storage medium of the network switch 112. Further, the sequencer data 502 may be accessed by the various modules and/or sub-modules of the network switch 112. Although the various data utilized by the network switch 112 is described herein as particular discrete data, such data may be combined, aggregated, and/or otherwise form portions of a single or multiple data sets, including duplicative copies, in other embodiments. It should be further appreciated that the network switch 112 may include additional and/or alternative components, sub-components, modules, sub-modules, and/or devices commonly found in a computing device, which are not illustrated in FIG. 5 for clarity of the description.

The communication management module 510, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the network switch 112. To do so, the communication management module 510 is configured to receive and process network packets from network computing devices (e.g., computing nodes 102, other network switches 112, etc.) communicatively coupled to the network switch 112 (e.g., via fabric interconnects). Additionally, the communication management module 510 is configured to prepare and transmit network packets to network computing devices (e.g., computing nodes 102, other network switches 112, etc.) communicatively coupled to the network switch 112 (e.g., via fabric interconnects).

The sequencer management module 520, which may be embodied as hardware, firmware, software, virtualized hardware, emulated architecture, and/or a combination thereof as discussed above, is configured to manage the sequencers initiated for creation and deletion by the computing nodes 102 acting as master computing nodes (i.e., those computing nodes 102 responsible for the management for sequencer sessions). To do so, the illustrative sequencer management module 520 includes a sequencer session management module 522 and a sequencer access management module 524. It should be appreciated that each of the sequencer session management module 522 and the sequencer access management module 524 of the sequencer management module 520 may be separately embodied as hardware, firmware, software, virtualized hardware, emulated architecture, and/or a combination thereof. For example, sequencer session management module 522 may be embodied as a hardware component, while the sequencer access management module 524 may be embodied as a virtualized hardware component or as some other combination of hardware, firmware, software, virtualized hardware, emulated architecture, and/or a combination thereof.

The sequencer session management module 522 is configured to manage the sequencer sessions. To do so, the sequencer session management module 522 is configured to create and delete (i.e., terminate) the sequencer sessions for which the network switch 112 has been identified as the target network switch for the respective sequencer sessions. To create the sequencer sessions, the sequencer session management module 522 is configured to allocate sequencing counters and assign associated sequencing counter IDs of the allocated sequencing counters to the initiating master computing nodes from which a sequencer creation message was received. Additionally, the sequencer session management module 522 is configured to generate and transmit an acknowledgement of a successful, or unsuccessful (e.g., a negative acknowledgment), sequencing counter assignment for a requested sequencer session to the requesting master computing node.

For successful sequencing counter assignment acknowledgements, the sequencer session management module 522 is configured to include the assigned sequencing counter ID with the acknowledgements. Similarly, to terminate, or otherwise end, an active sequencer session, the sequencer session management module 522 is configured to free the associated sequencing counter (e.g., by removing the value associated with the sequencing counter ID of the freed sequencing counter). Additionally, the sequencer session management module 522 is configured to generate and transmit an acknowledgement of a successful, or unsuccessful (e.g., a negative acknowledgment), sequencer session termination to the requesting master computing node.

The sequencer access management module 524 is configured to manage requested access to the sequencing counters of active sequencer sessions. To do so, the sequencer access management module 524 is configured to receive a sequencer access message from a computing node 102, retrieve the operation parameters included therein, and perform an operation based on the retrieved parameters. The sequencer access management module 524 is further configured to increment the sequencing counter associated with the sequencer session and associate a result of the performed operation with the sequencing counter ID corresponding to the sequencing counter of that sequencer session. Additionally, the sequencer access management module 524 is configured to transmit an acknowledgement of a successful, or unsuccessful (e.g., a negative acknowledgment), sequencing counter access that includes updated sequencer session data. The updated sequencer session data includes the updated sequencing counter value (i.e., the result associated with the corresponding sequencing counter ID of the sequencer session for which the operation was performed) and the updated sequencing counter ID.

Figure 6:
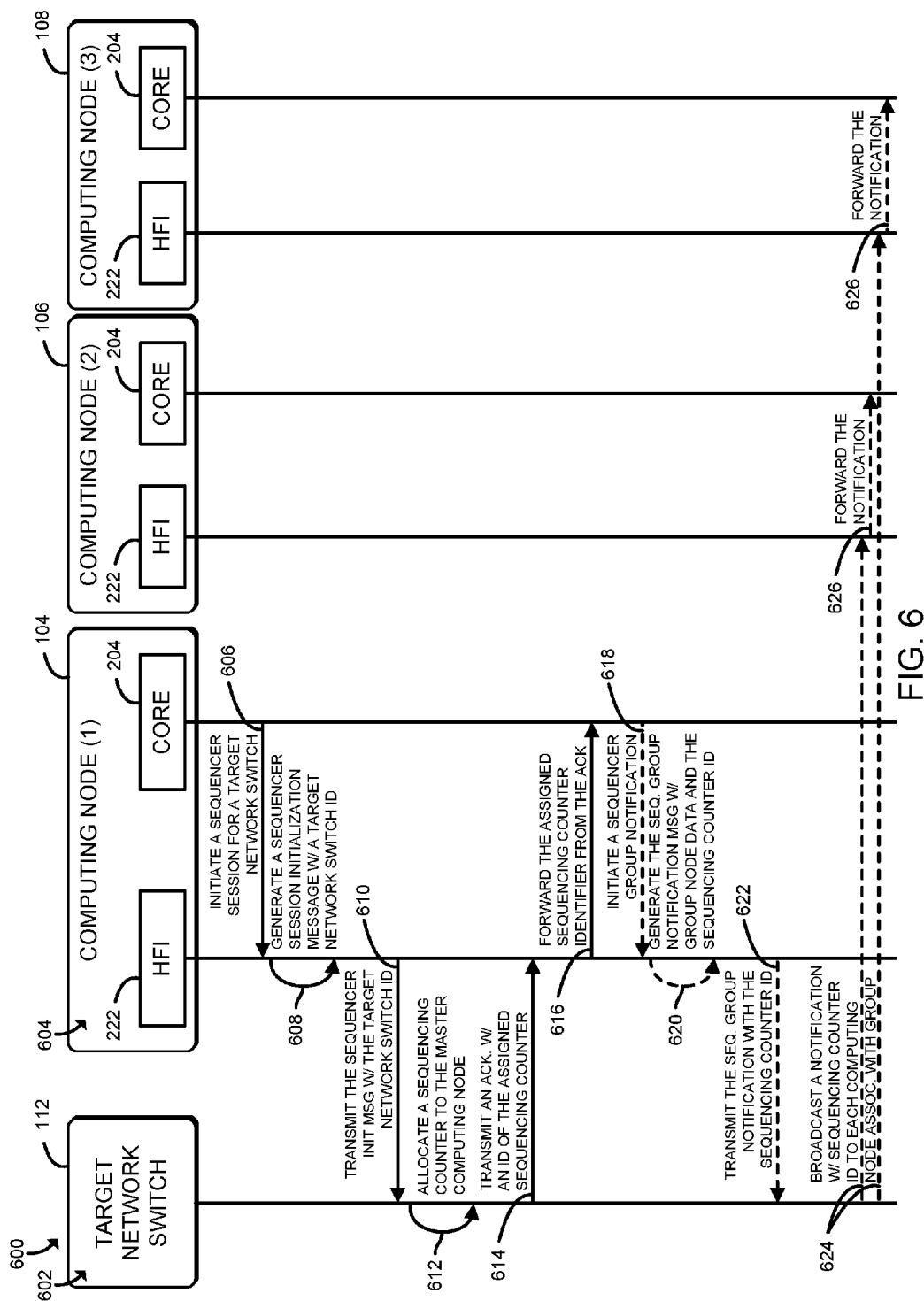
FIG. 6 is a simplified communication flow diagram of at least one embodiment of an illustrative sequencer session initialization initiated by one of computing nodes of the system of the system of FIG. 1.

Referring now to FIG. 6, an embodiment of a communication flow 600 of an illustrative sequencer session initialization between a master computing node 604 (e.g., one of the processor cores 204 and the HFI 222 of the computing node (1) 104 of FIG. 1) and a target network switch 602 (i.e., the network switch 112 of FIG. 1). The communication flow 600 additionally includes the computing node (2) 106 of FIG. 1 and the one of the processor cores 204 and the HFI 222 thereof, as well as the computing node (3) 108 of FIG. 1 and the one of the processor cores 204 and the HFI 222 thereof. The illustrative communication flow 600 includes a number of data flows, some of which may be executed separately or together, depending on the embodiment.

The communication flow 600 begins with data flow 606, in which an application (e.g., thread, process, etc.) presently executing on the one of the processor cores 204 of the master computing node 604 initiates a sequencer session with the HFI 222 (e.g., via instruction(s) from the software stack). To do so, the application transmits a sequencer session initialization request to the HFI 222, such as by executing an instruction that indicates a sequencer session is to be initiated by the HFI 222. In some embodiments, the instruction may include a pointer to a location in memory at which one or more parameters of the sequencer session may be stored. In data flow 608, the HFI 222 of the master computing node 604 generates a sequencer session initialization message that includes an identifier of the target network switch 602 (i.e., a target network switch identifier). As described previously, the target network switch identifier may include any data usable to uniquely identify the network switch 112 that is to initialize the sequencer session, such as an IP address, a MAC address, etc. In data flow 610, the HFI 222 of the master computing node 604 transmits the sequencer session initialization message generated in data flow 608 to the target network switch 602.

It should be appreciated that the target network switch 602 may, upon receiving the sequencer session initialization message, determine whether an identifier of the target network switch 602 received in the sequencer session initialization message matches the target network switch identifier received in the sequencer session initialization message. If the target network switch 602 determines the target network switch identifier received in the sequencer session initialization message does not match the received target network switch identifier, the target network switch 602 may forward the received sequencer session initialization message to the actual target network switch (i.e., based on the target network switch identifier), rather than proceed with the communication flow 600.

In data flow 612, the target network switch 602 allocates a sequencer (i.e., a sequencing counter) to the master computing node 604. To do so, the target network switch 602 assigns an identifier of the sequencing counter (i.e., a sequencing counter ID) to the master computing node 604 and initializes a corresponding value associated with the sequencing counter ID. For example, in some embodiments, the sequencing counter ID and associated value may be tracked in a table (e.g., assigned tracking table) that includes the assigned sequencing counter IDs mapped to associated values. In some embodiments, the assigned tracking table may additionally include those sequencing counter IDs which are not presently assigned to a sequencing session (i.e., free sequencing counter IDs).

Alternatively, in other embodiments, the free sequencing counter IDs may be stored in a separate table (e.g., a free tracking table) used to maintain the free sequencing counter IDs. In such embodiments, the free sequencing counter IDs may be transmitted from the free tracking table to the assigned tracking table upon successful assignment. In data flow 614, the target network switch 602 generates and transmits an acknowledgment message indicating a successful assignment of a sequencing counter ID (i.e., an acknowledgment of successful sequencer session initialization) that includes the sequencing counter ID to the HFI 222 of the master computing node 604. In data flow 616, the HFI 222 of the master computing node 604 forwards the assigned sequencing counter ID received in the acknowledgment message to the one of the processor cores 204 of the master computing node 604 (e.g., via instruction(s) to the software stack).

In data flow 618, the one of the processor cores 204 of the master computing node 604 may initiate a sequencer group notification by transmitting a group notification request to the HFI 222 of the master computing node 604 (e.g., via instruction(s) to the software stack). The group notification request may include any instruction that is usable by the HFI 222 to generate and transmit a message to the target network switch 602 that indicates which one or more other computing nodes 102 are to be notified of the assigned sequencing counter ID, such that those other computing nodes 102 may access the sequencing counter (e.g., to have operations performed thereon). Accordingly, group notification requests may include identifiers of the other computing nodes 102 (e.g., the computing node (2) 106, the computing node (3) 108, etc.) to be assigned to the group and the sequencing counter ID. Similar to the target network switch identifier described previously, the identifiers of the other computing nodes 102 may include any data usable to uniquely identify the network switch 112 that is to initialize the sequencer session, such as an IP address, a MAC address, etc.

In data flow 620, the HFI 222 of the master computing node 604 generates a sequencer group notification message that includes the identifiers of the other computing nodes 102 and the sequencing counter ID. In data flow 622, the HFI 222 transmits the sequencer group notification message to the target network switch 602. In some embodiments, in data flow(s) 624, the target network switch 602 may additionally broadcast (e.g., via unicast transmissions) a notification that includes the sequencing counter ID to the respective HFIs of each of the other computing nodes 102 previously associated with the sequencer group. Additionally, in such embodiments, in data flow(s) 626, each of the respective HFIs 222 of each of the other computing nodes 102 may forward the notification to the respective one of the processor cores 204 of that other computing node 102.

Figure 7:
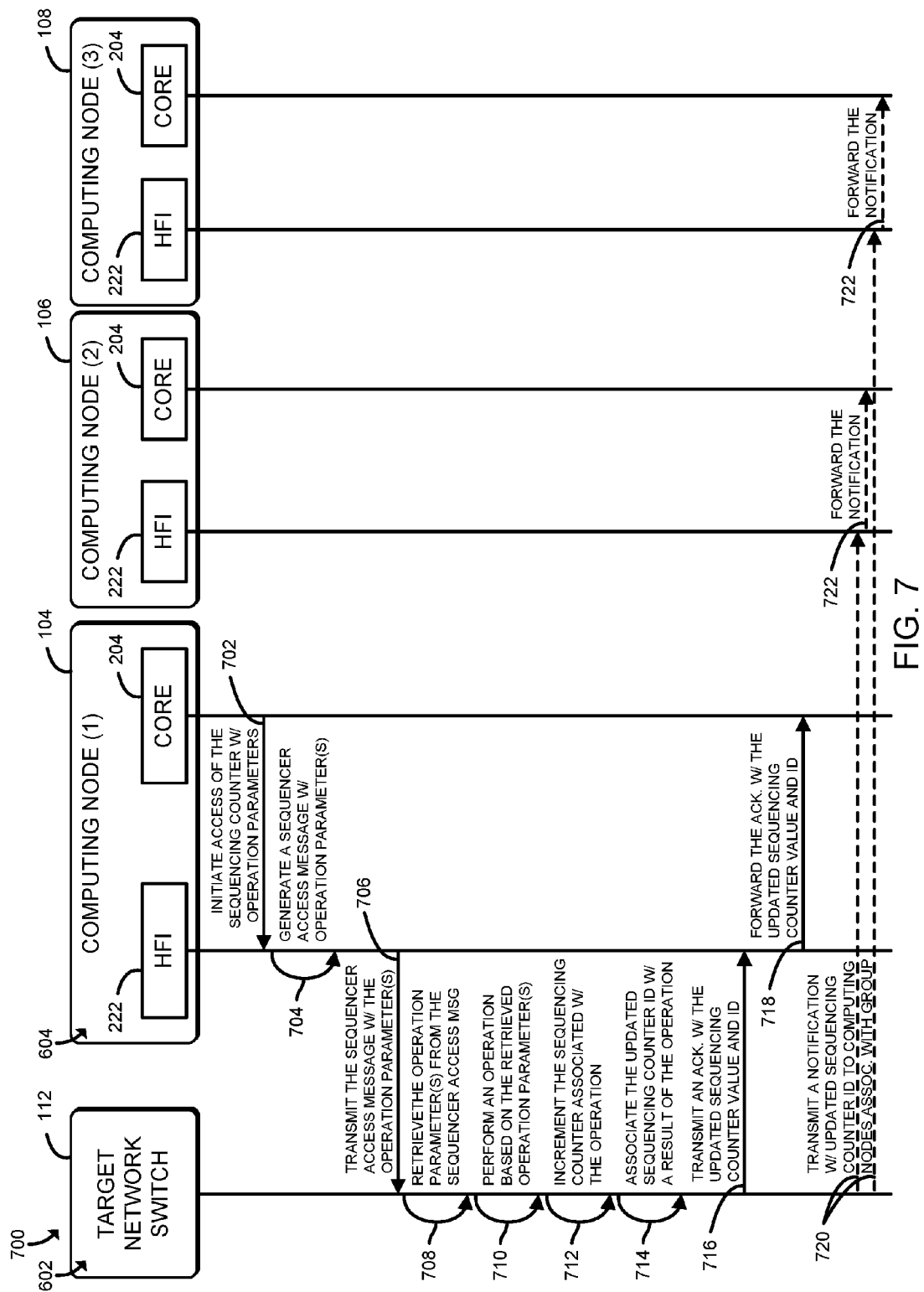
FIG. 7 is a simplified communication flow diagram of at least one embodiment of an illustrative sequencing counter access that may be initiated by the computing node of FIGS. 2 and 4.

Referring now to FIG. 7, an embodiment of a communication flow 700 of an illustrative sequencing counter access between a master computing node 604 (e.g., one of the processor cores 204 and the HFI 222 of the computing node (1) 104 of FIG. 1) and a target network switch 602 (i.e., the network switch 112 of FIG. 1). The illustrative communication flow 700 additionally includes the computing node (2) 106 of FIG. 1 and the one of the processor cores 204 and the HFI 222 thereof, as well as the computing node (3) 108 of FIG. 1 and the one of the processor cores 204 and the HFI 222 thereof. Additionally, the illustrative communication flow 700 includes a number of data flows, some of which may be executed separately or together, depending on the embodiment.

The communication flow 700 begins with data flow 702, in which an application (e.g., thread, process, etc.) presently executing on the one of the processor cores 204 of the master computing node 604 initiates an access to a sequencing counter of a presently open sequencer session with the HFI 222. To initiate the sequencer session access, the application may transmit one or more instructions (e.g., via the software stack) from the one of the processor cores 204 to the HFI 222. Accordingly, in such embodiments, the instructions may include a location in memory (e.g., cache, main memory, data storage device, etc.) of the master computing node 604 in which sequencer session data (e.g., a sequencing counter ID, a present value associated with the sequencing counter ID, operation parameters, etc.) may be stored.

While data flow 702 is shown being initiated by the master computing node 604, it should be appreciated that any other computing node 102 previously notified of the sequencing counter may initiate the sequencing counter access. To initiate the sequencer session, the application transmits a sequencing counter access request to the HFI 222, such as by executing an instruction that includes the sequencing counter ID of the sequencer counter to be accessed. As described previously, in some embodiments, the instruction may include a pointer to a location in memory at which one or more parameters of the sequencer session may be stored.

In data flow 704, the HFI 222 of the master computing node 604 generates a sequencer access message that includes sequencer session data, such as an identifier of the target network switch 602 (i.e., a target network switch identifier), a sequencing counter ID, etc., as well as one or more operation parameters. As described previously, the operation parameters may include any data usable to by the target network switch 602 to perform an operation on a value associated with the sequencing counter to be accessed, such as an operation indicator (e.g., a mathematical symbol, a mutator method, etc.) and/or an operand value. As also described previously, the target network switch identifier may include any data usable to uniquely identify the network switch 112 on which the sequencer session is managed (i.e., the target network switch 602 in the illustrative communication flow 700), such as an IP address, a MAC address, etc. In data flow 706, the HFI 222 of the master computing node 604 transmits the sequencer access message generated in data flow 704.

It should be appreciated that the target network switch 602 may, upon receiving the sequencer access message, determine whether an identifier of the target network switch 602 received in the sequencer access message matches the target network switch identifier received in the sequencer access message. If the target network switch 602 determines the target network switch identifier received in the sequencer access message does not match the received target network switch identifier, the target network switch 602 may forward the received sequencer access message to the actual target network switch (i.e., based on the target network switch identifier), rather than proceed with the communication flow 700.

In data flow 708, the target network switch 602 retrieves the one or more operation parameters from the sequencer access message. In data flow 710, the target network switch 602 performs an operation (e.g., a mathematical operation, a get operation, a set operation, a put operation, etc.) based on the retrieved operation parameters. In data flow 712, the target network switch 602 increments the sequencing counter associated with the sequencer session. In data flow 714, the target network switch 602 associated the incremented sequencing counter with a result of the operation. In other words, the target network switch 602 associates the resulting value of the operation with the updated sequencing counter ID, such as may be tracked in a table of sequencing counter ID mapped to associated values (e.g., in the assigned tracking table described above).

In data flow 716, the target network switch 602 generates an acknowledgment message indicating the sequencer access was successful (i.e., an acknowledgment of successful access) that includes updated sequencer session data (e.g., the updated sequencing counter ID and the associated value), and transmits the generated acknowledgment message to the HFI 222 of the master computing node 604. In data flow 718, the HFI 222 of the master computing node 604 forwards the updated sequencing counter ID and associated value from the received acknowledgment to the respective one of the processor cores 204 of that other computing node 102 (e.g., via instruction(s) to the software stack).

In some embodiments, in data flow(s) 720, the target network switch 602 may further transmit a notification message with the updated sequencing counter ID and associated value to the other computing nodes 102 that have been previously notified of the sequencing counter ID as members of a previously set up sequencer group. Additionally, in such embodiments, in data flow(s) 722, each of the respective HFIs 222 of each of the other computing nodes 102 may forward the notification to the respective one of the processor cores 204 of that other computing node 102.

Figure 8:
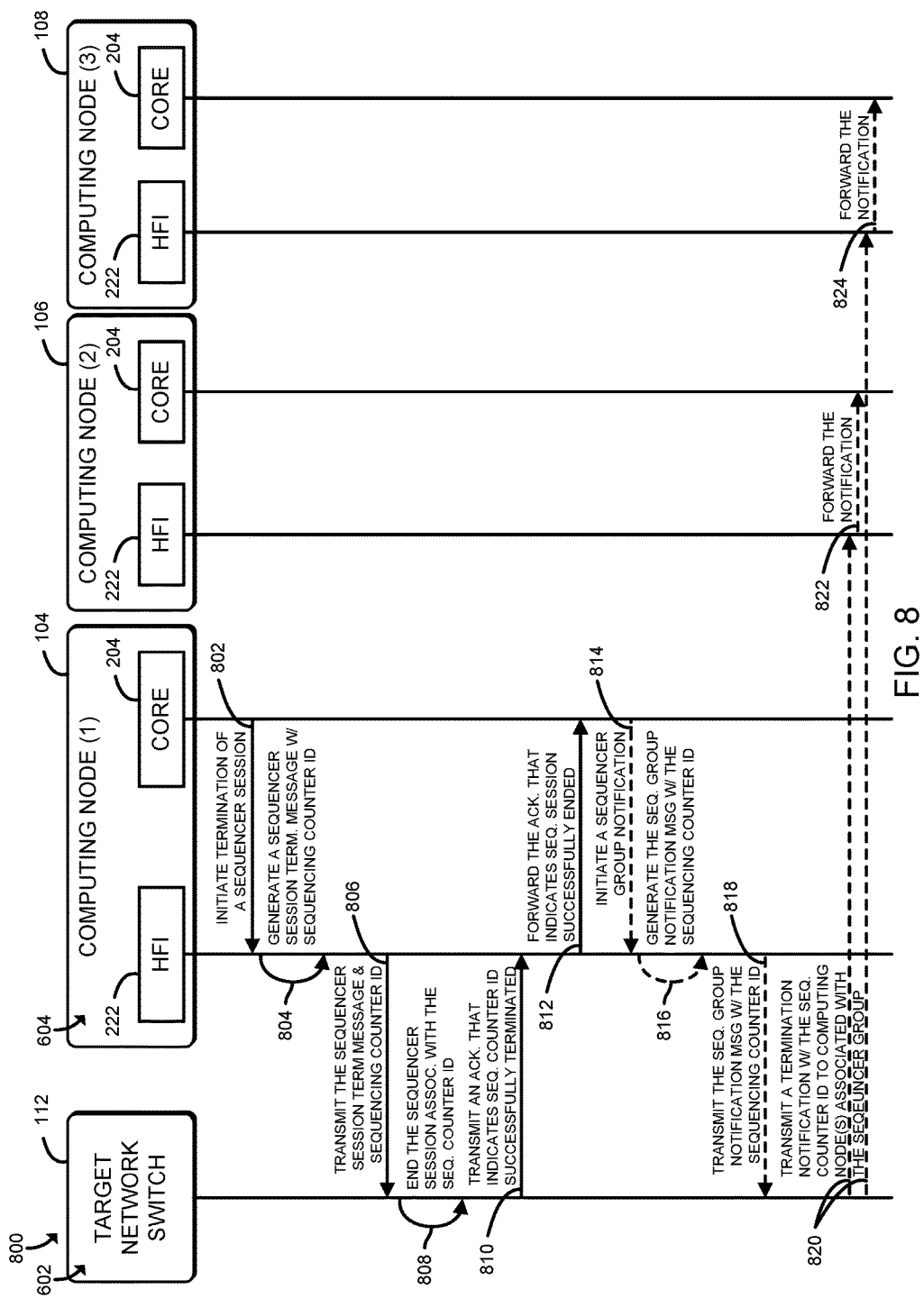
FIG. 8 is a simplified communication flow diagram of at least one embodiment of an illustrative sequencer session termination that may be initiated by the computing node of FIGS. 2 and 4.

Referring now to FIG. 8, an embodiment of a communication flow 800 of an illustrative sequencer session termination between a master computing node 604 (e.g., one of the processor cores 204 and the HFI 222 of the computing node (1) 104 of FIG. 1) and a target network switch 602 (i.e., the network switch 112 of FIG. 1). The illustrative communication flow 800 additionally includes the computing node (2) 106 of FIG. 1 and the one of the processor cores 204 and the HFI 222 thereof, as well as the computing node (3) 108 of FIG. 1 and the one of the processor cores 204 and the HFI 222 thereof. Additionally, the illustrative communication flow 800 includes a number of data flows, some of which may be executed separately or together, depending on the embodiment.

The communication flow 800 begins with data flow 802, in which an application (e.g., thread, process, etc.) presently executing on the one of the processor cores 204 of the master computing node 604 initiates the termination of a sequencer session with the HFI 222 (e.g., via instruction(s) from the software stack). To do so, the application transmits a sequencer session termination request to the HFI 222, such as by executing an instruction that indicates a sequencer session is to be termination by the HFI 222. In some embodiments, the instruction may include a pointer to a location in memory at which one or more parameters of the sequencer session may be stored. For example, the parameters may include the sequencing counter ID associated with the sequencer session. Alternatively, in some embodiments, the instruction itself may include the sequencing counter ID.

In data flow 804, the HFI 222 of the master computing node 604 generates a sequencer session termination message that includes an identifier of the target network switch 602 (i.e., a target network switch identifier) and the sequencing counter ID. As described previously, the target network switch identifier may include any data (e.g., an IP address, a MAC address, etc.) that is usable to uniquely identify the network switch 112 on which the sequencer session is being managed. In data flow 806, the HFI 222 of the master computing node 604 transmits the sequencer session termination message generated in data flow 804 to the target network switch 602.

It should be appreciated that the target network switch 602 may, upon receiving the sequencer session termination message, determine whether an identifier of the target network switch 602 received in the sequencer session termination message matches the target network switch identifier received in the sequencer session termination message. If the target network switch 602 determines the target network switch identifier received in the sequencer session termination message does not match the received target network switch identifier, the target network switch 602 may forward the received sequencer session termination message to the actual target network switch (i.e., based on the target network switch identifier), rather than proceed with the communication flow 800.

In data flow 808, the target network switch 602 terminates or otherwise ends the sequencing session associated with the sequencing counter ID. To do so, the target network switch 602 may free a value associated with the sequencing counter ID. As described previously, in some embodiments, the sequencing counter ID and associated value may be tracked in a table (e.g., assigned tracking table) that includes the assigned sequencing counter IDs mapped to associated values. Accordingly, in such embodiments, the value associated with the sequencing counter ID may be removed from the assigned tracking table. As also described previously, in alternative embodiments, the assigned tracking table may be distinct from a table of sequencing counter IDs which are not presently assigned to a sequencing session (i.e., free sequencing counter IDs). In other words, in such embodiments, the free sequencing counter IDs may be stored in a separate table (e.g., a free tracking table) used to maintain the free sequencing counter IDs. In such embodiments, the sequencing counter ID may be transmitted from the assigned tracking table to the free tracking table upon successful termination of the sequencer session.

In data flow 810, the target network switch 602 generates and transmits an acknowledgment message indicating a successful termination of the sequencer session (i.e., an acknowledgment of successful termination) to the HFI 222 of the master computing node 604. In data flow 812, the HFI 222 of the master computing node 604 forwards the acknowledgment to the one of the processor cores 204 of the master computing node 604 (e.g., via instruction(s) to the software stack).

In data flow 814, the one of the processor cores 204 of the master computing node 604 may initiate a sequencer group notification by transmitting a group notification request to the HFI 222 of the master computing node 604 (e.g., via instruction(s) to the software stack). The group notification request may include any instruction that is usable by the HFI 222 to generate and transmit a message to the target network switch 602 that indicates which of the one or more other computing nodes 102 are to be notified of the sequencer session termination such that those other computing nodes 102 do not attempt to access the sequencing counter associated with the terminated sequencer session. Accordingly, group notification requests may include identifiers of the other computing nodes 102 (e.g., the computing node (2) 106, the computing node (3) 108, etc.) to be assigned to the group and the sequencing counter ID. Similar to the target network switch identifier described previously, the identifiers of the other computing nodes 102 may include any data usable to uniquely identify the network switch 112 that is to initialize the sequencer session, such as an IP address, a MAC address, etc.

In data flow 816, the HFI 222 of the master computing node 604 generates a sequencer group notification message that includes the identifiers of the other computing nodes 102 and the sequencing counter ID. In data flow 818, the HFI 222 transmits the sequencer group notification message to the target network switch 602. In some embodiments, in data flow(s) 820, the target network switch 602 may additionally broadcast (e.g., via unicast transmissions) a notification that includes the sequencing counter ID to the respective HFIs of each of the other computing nodes 102 previously associated with the sequencer group. Additionally, in such embodiments, in data flow(s) 822, each of the respective HFIs 222 of each of the other computing nodes 102 may forward the notification to the respective one of the processor cores 204 of that other computing node 102.

Figure 9:
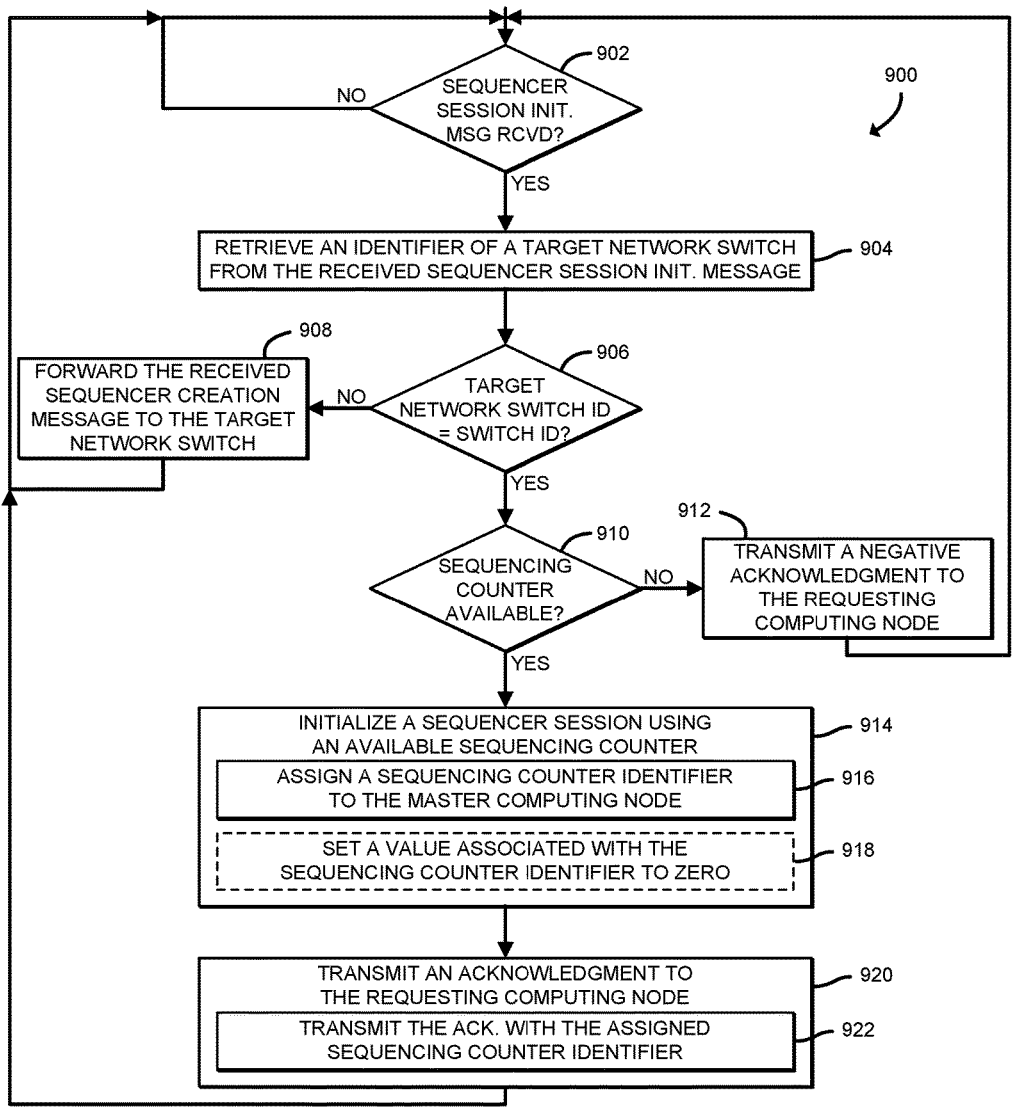
FIG. 9 is a simplified flow diagram of at least one embodiment of a method for initializing a sequencer session that may be executed by the network switch of FIGS. 3 and 5.

Referring now to FIG. 9, in use, the network switch 112 may execute a method 900 for initializing a sequencer session. The method 900 begins in block 902, in which the network switch 112 determines whether a sequencer session initialization message has been received. If so, the method 900 advances to block 904, in which the network switch 112 retrieves an identifier of a target network switch (see, e.g., the target network switch 602 of FIGS. 6-8) from the sequencer session initialization message received in block 902. As described previously, the sequencer session is initiated by an application (e.g., a thread, a process, etc.) running on a processor core of a processor of one of the computing nodes 102 communicatively coupled to the network switch 112, referred to herein as a master computing node (see, e.g., the master computing node 604 of FIGS. 6-8).

To do so, the application transmits a sequencer session initialization request to an HFI of the master computing node (e.g., the HFI 222 of the illustrative computing node 102 of FIG. 2), such as by executing an instruction that indicates a sequencer session is to be initiated by the HFI. As described previously, n some embodiments, instruction may include a pointer to a location in memory at which one or more parameters of the sequencer session may be stored. Further, the sequencer session initialization message is transmitted to the network switch 112 via an HFI of the master computing node (e.g., the HFI 222 of the illustrative computing node 102 of FIG. 2). As also described previously, the sequencer session initialization message includes an identifier of the target network switch on which the sequencer session is to be initialized.

In block 906, the network switch 112 determines whether the target network switch identifier retrieved in block 904 matches the identifier of the network switch 112. If not, the method 900 branches to block 908, in which the network switch 112 forwards the received sequencer session initialization message to the target network switch (e.g., as indicated by the target network switch identifier). Otherwise, if the network switch 112 determines the target network switch identifier matches the identifier of the network switch 112, the method branches to block 910. In block 910, the network switch 112 determines whether a sequencing counter is available. As described previously, in some embodiments, the network switch 112 may track assigned and available sequencing counters in one or more tables (e.g., an assigned tracking table, a free tracking table, etc.). Accordingly, in such embodiments, the network switch 112 may determine whether a sequencing counter is available based on a query of the one or more tables.

If the network switch 112 determines that a sequencing counter is not available, the method 900 branches to block 912, in which the network switch 112 generates a negative acknowledgment that indicates the requested sequencer session could not be initialized and transmits the generated negative acknowledgment to the HFI of the requesting computing node 102. Otherwise, if the network switch 112 determines that a sequencing counter is available at block 910, the method 900 branches to block 914 in which the network switch 112 initializes a sequencer session using an available sequencing counter. To do so, in block 916, the network switch 112 assigns a sequencing counter ID associated with the available sequencing counter to the master computing node. Additionally, in some embodiments, in block 918, the network switch 112 sets a value associated with, or otherwise mapped to, the sequencing counter to zero.

In block 920, the network switch 112 transmits an acknowledgment to the master computing node indicating a successful initialization of the requested sequencer session (i.e., an acknowledgment of successful sequencer session initialization). Additionally, in block 922, the network switch 112 transmits the acknowledgment with the assigned sequencing counter ID.

Figure 10:
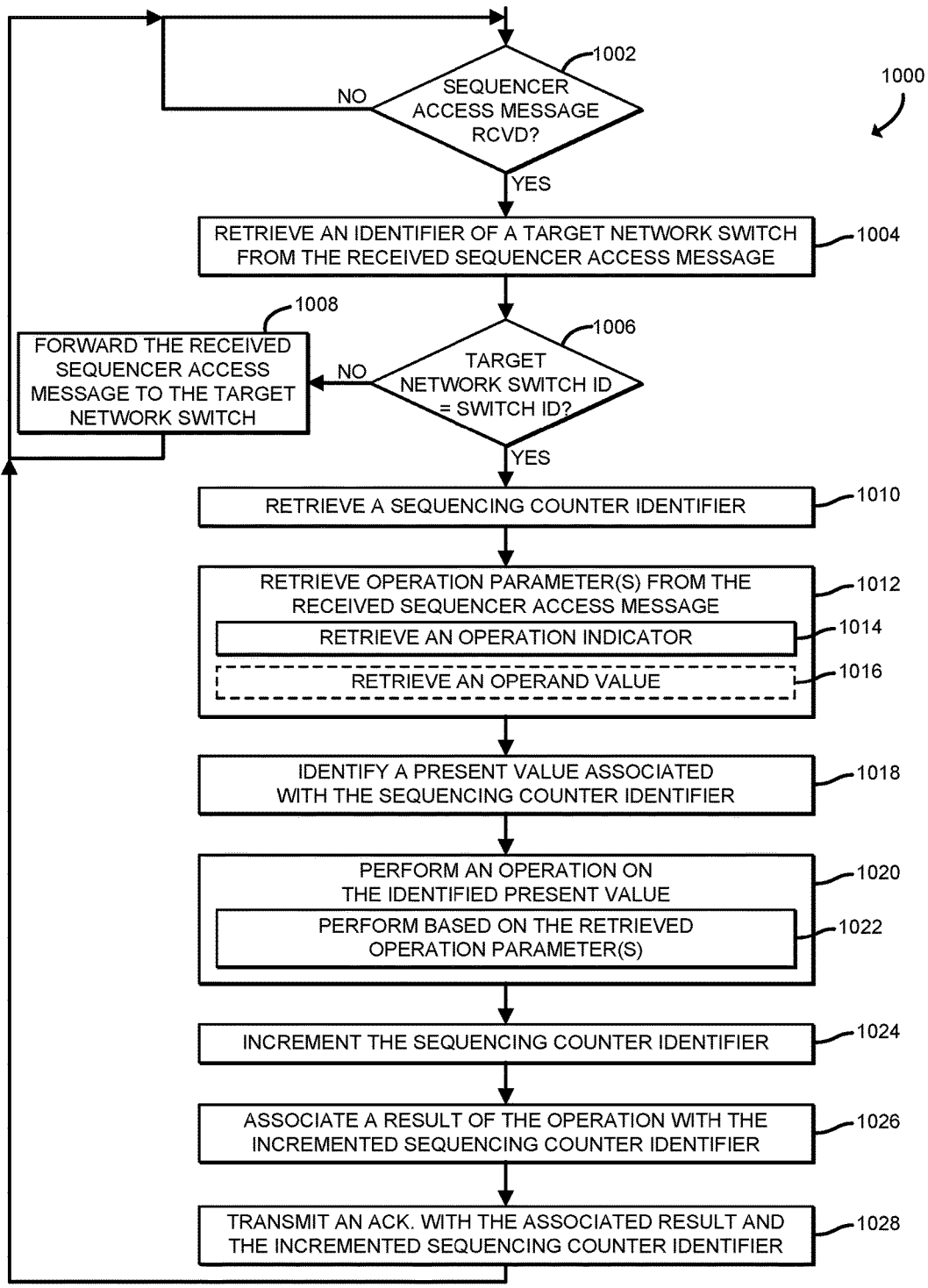
FIG. 10 is a simplified flow diagram of at least one embodiment of a method for accessing a sequencing counter of an initialized and presently active sequencer session that may be executed by the network switch of FIGS. 3 and 5.

Referring now to FIG. 10, in use, the network switch 112 may execute a method 1000 for accessing a sequencing counter of an initialized and presently active sequencer session. The method 1000 begins in block 1002, in which the network switch 112 determines whether a sequencer access message has been received from a computing node 102. If so, the method 1000 advances to block 1004, in which the network switch 112 retrieves an identifier of a target network switch (see, e.g., the target network switch 602 of FIGS. 6-8) from the sequencer access message received in block 1002. As described previously, the sequencer session is initiated by an application running on one of the computing nodes 102 communicatively coupled to the network switch 112, referred to herein as a master computing node (see, e.g., the master computing node 604 of FIGS. 6-8), and the sequencer access message is transmitted to the network switch 112 via an HFI of the master computing node (e.g., the HFI 222 of the illustrative computing node 102 of FIG. 2). As also described previously, the sequencer access message includes an identifier of the target network switch on which the sequencer session was initialized (see, e.g., the method 900 of FIG. 9).

In block 1006, the network switch 112 determines whether the target network switch identifier retrieved in block 1004 matches the identifier of the network switch 112. If not, the method 1000 branches to block 1008, in which the network switch 112 forwards the received sequencer access message to the target network switch (e.g., as indicated by the target network switch identifier). Otherwise, if the network switch 112 determines the target network switch identifier matches the identifier of the network switch 112, the method branches to block 1010. In block 1010, the network switch 112 retrieves a sequencing counter ID from the received sequencer access message.

In block 1012, the network switch 112 retrieves one or more operation parameters from the received sequencer access message. As described previously, the operation parameters may include any data usable to by the network switch 112 to perform an operation on a value associated with the sequencing counter to be accessed, such as an operation indicator (e.g., a mathematical symbol, a mutator method, etc.) and/or an operand value. Accordingly, in block 1014, the network switch 112 retrieves an operation indicator from the received sequencer access message. Additionally, in some embodiments, in block 1016, the network switch 112 may retrieve an operand value from the received sequencer access message.

In block 1018, the network switch 112 identifies a present value associated with the sequencing counter ID retrieved in block 1010, such as from an entry of a table mapping the present value associated with the sequencing counter ID (e.g., the assigned tracking table described previously). In block 1020, the network switch 112 performs an operation on the present value identified in block 1018. To do so, in block 1022, the network switch 112 performs the operation as a function of the one or more operation parameters retrieved in block 1012. In block 1024, the network switch 112 increments the sequencing counter ID. In block 1026, the network switch 112 associates a result of the operation performed in block 1022 with the sequencing counter ID incremented in block 1024, such as by updating a corresponding entry in the assigned tracking table. In block 1028, the network switch 112 transmits an acknowledgment with the associated operation result and incremented sequencing counter ID to the HFI of the requesting computing node 102 indicating that the sequencer access was successful (i.e., an acknowledgment of successful access).

It should be appreciated that at least a portion of the methods 900 and 1000 may be executed by the communication circuitry 308 of the network switch 112. It should be further appreciated that, in some embodiments, at least a portion of one or both of the methods 900 and 1000 may be embodied as various instructions stored on a computer-readable media, which may be executed by the processor 300, the communication circuitry 308, and/or other components of the network switch 112 to cause the network switch 112 to perform the methods 900 and 1000. The computer-readable media may be embodied as any type of media capable of being read by the network switch 112 including, but not limited to, the main memory 304, the data storage device 306, other memory or data storage devices of the network switch 112, portable media readable by a peripheral device of the network switch 112, and/or other media.

Figure 11:
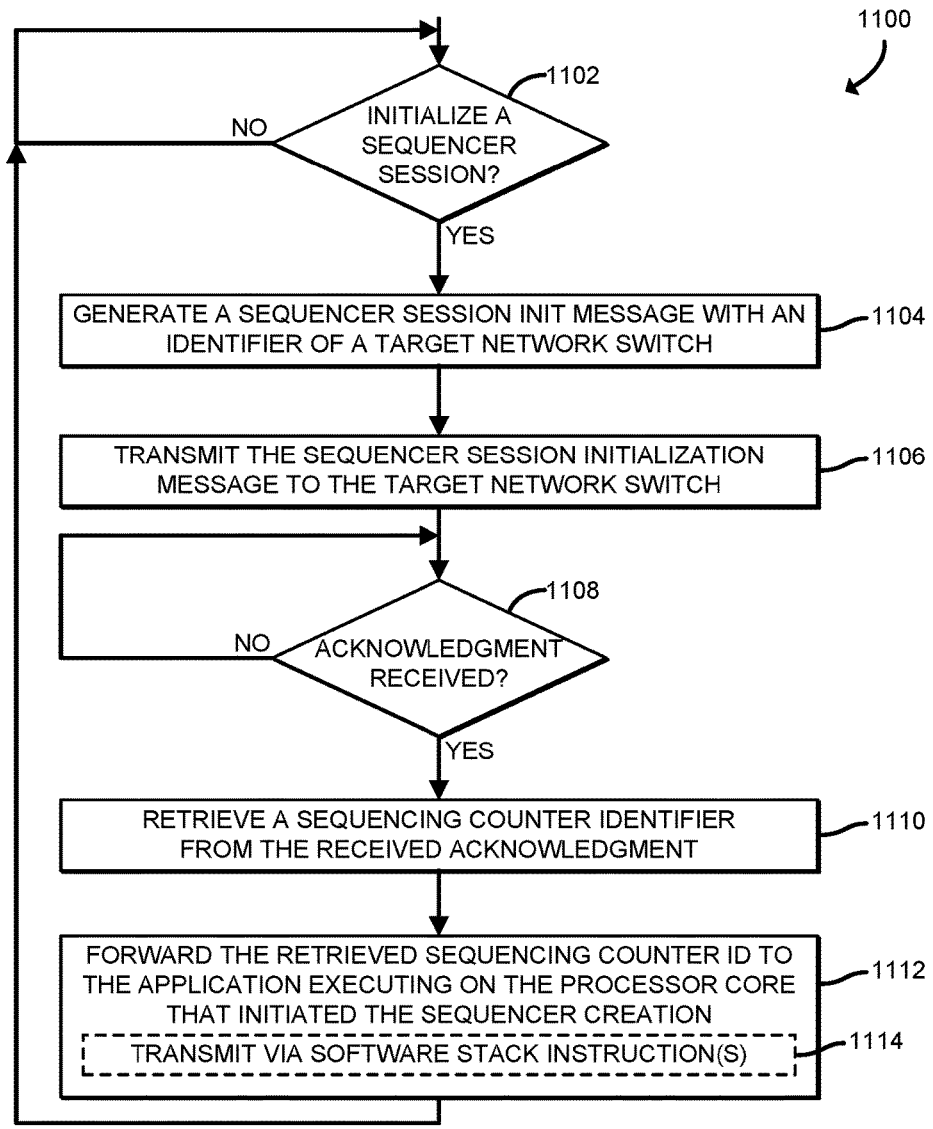
FIG. 11 is a simplified flow diagram of at least one embodiment of a method for initiating an initialization of a sequencer session that may be executed by one of the computing nodes of FIGS. 2 and 4.

Referring now to FIG. 11, in use, one of the computing nodes 102 acting as a master computing node may execute a method 1100 for initializing a sequencer session from a master computing node. The method 1100 begins in block 1102, in which an HFI (e.g., the HFI 222 of FIG. 2) of the master computing node determines whether to initialize a sequencer session. If so, the method 1100 advances to block 1104, in which the HFI of the master computing node generates a sequencer session initialization message that includes an identifier of a target network switch indicating which network switch 112 to initialize the sequencer session. As described previously, the sequencer session is initiated by an application (e.g., thread, process, etc.) presently executing on a processor core of the master computing node. As also described previously, the application initiates the sequencer session by providing an instruction to the HFI of the master computing node (e.g., via instruction(s) from the software stack).

In block 1106, the HFI of the master computing node transmits the sequencer session initialization message to the target network switch. In block 1108, the HFI determines whether an acknowledgment (i.e., an acknowledgment of successful sequencer session initialization) has been received. If so, the method 1100 advances to block 1110, in which the HFI retrieves a sequencing counter ID from the received acknowledgment. In block 1112, the HFI forward the retrieved sequencing counter ID to the application presently executing on the processor core that initiated the sequencer session initialization. To do so, in block 1114, the HFI transmits one or more instructions via the software stack.

Figure 12:
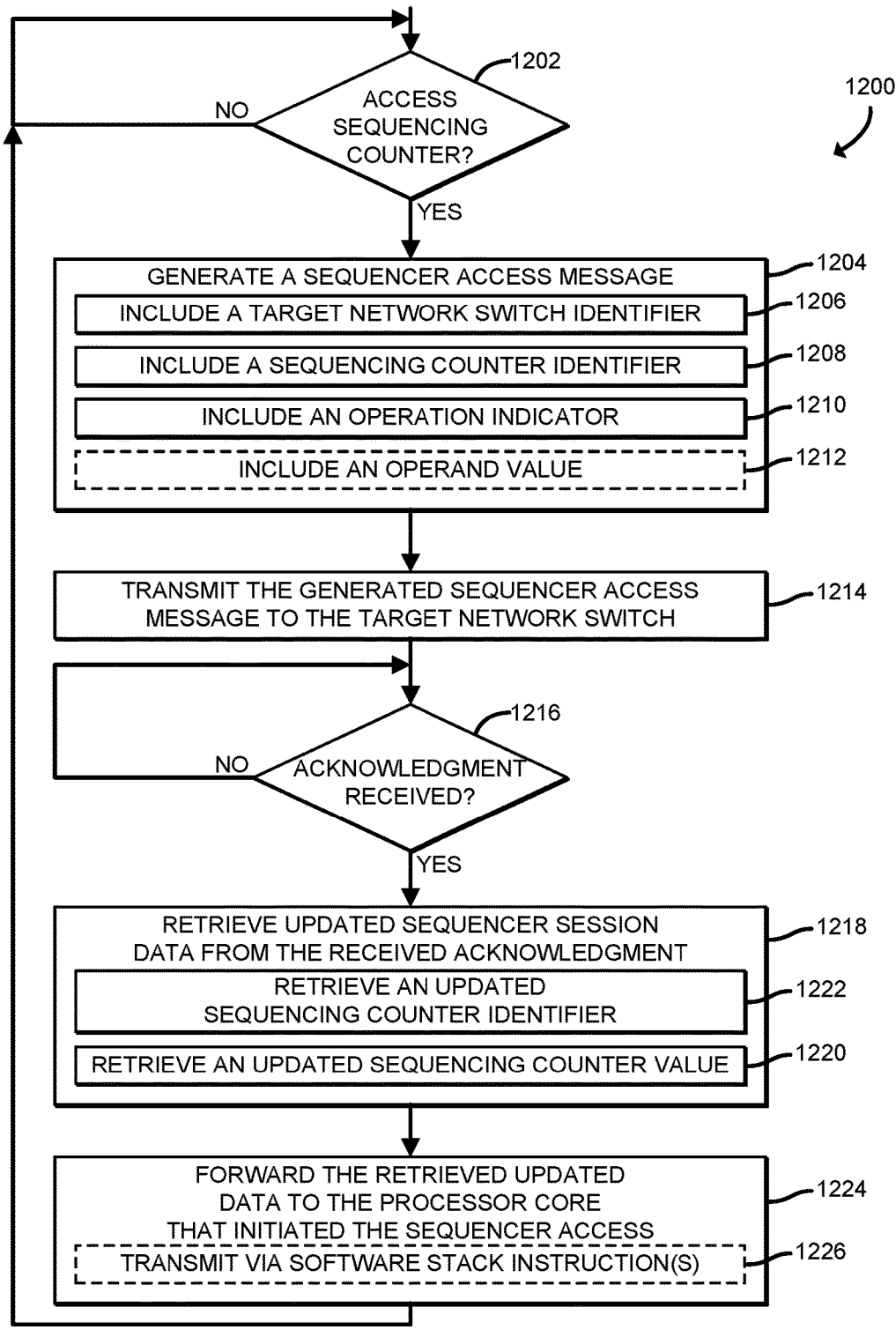
FIG. 12 is a simplified flow diagram of at least one embodiment of a method for accessing a sequencing counter of an initialized and presently active sequencer session that may be executed by one of the computing nodes of FIGS. 2 and 4.

Referring now to FIG. 12, in use, one of the computing nodes 102 acting as a master computing node may execute a method 1200 for accessing a sequencing counter of an initialized and presently active sequencer session. The method 1200 begins in block 1202, in which the master computing node determines whether to access the sequencing counter. If so, the method 1200 advances to block 1204, in which an HFI (e.g., the HFI 222 of FIG. 2) of the master computing node generates a sequencer access message that includes sequencer session data (e.g., a target network switch identifier, the sequencing counter ID, etc.) and one or more operation parameters.

As described previously, the sequencer session access is initiated by an application (e.g., a thread, a process, etc.) presently executing on a processor core of a processor of the master computing node. As also described previously, the application may initiate the sequencer session access by transmitting one or more instructions (e.g., via the software stack) from the processor core to the HFI. Accordingly, in such embodiments, the instructions may include a location in memory (e.g., cache, main memory, data storage device, etc.) of the master computing node in which sequencer session data (e.g., a sequencing counter ID, a present value associated with the sequencing counter ID, operation parameters, etc.) may be stored.

In block 1206, the HFI includes a target network switch identifier with the sequencer access message. As described previously, the target network switch identifier identifies the network switch 112 on which the sequencer session was initialized. Accordingly, the target network switch identifier may include any data usable to uniquely identify the network switch 112, such as an IP address, a MAC address, etc., in which the sequencer session was previously initialized and presently managed by. Additionally, in block 1208, the HFI includes a sequencing counter ID with the sequencer access message that corresponds to the sequencing counter to be accessed. In addition, in block 1210, the HFI includes an operation indicator (e.g., a mathematical symbol, a mutator method, etc.) with the sequencer access message. In some embodiments, in block 1212, the HFI may also include an operand value with the sequencer access message. It should be appreciated that, in some embodiments, the In block 1214, the HFI transmits the generated sequencer access message to the target network switch. In block 1216, the HFI determines whether an acknowledgment (i.e., an acknowledgment of successful access) has been received from the target network switch in response to the transmitted sequencer access message. In block 1218, the HFI retrieves updated sequencer session data from the acknowledgment received in block 1216. For example, in block 1220, the HFI retrieves an updated sequencing counter ID. Additionally, in block 1222, the HFI retrieves an updated sequencing counter value associated with the updated sequencing counter ID. In block 1224, the HFI forwards the updated sequencer session data to the application presently executing on the processor core that initiated the sequencer session initialization. To do so, in block 1226, the HFI transmits one or more instructions via the software stack.

It should be appreciated that at least a portion of the methods 1100 and 1200 may be executed by at least one of the processor cores 204, 210 of the processors 202, 208, and/or the communication circuitry 220 of the computing node 102, and more specifically the HFI 222 of the computing node 102. It should be further appreciated that, in some embodiments, at least a portion of one or both of the methods 1100 and 1200 may be embodied as various instructions stored on a computer-readable media, which may be executed by one or more of the processors 202, 208, the communication circuitry 220, and/or other components of the computing node 102 to cause the computing node 102 to perform the methods 1100 and 1200. The computer-readable media may be embodied as any type of media capable of being read by the computing node 102 including, but not limited to, the main memory 216, the data storage device 218, other memory or data storage devices of the computing node 102, portable media readable by a peripheral device of the computing node 102, and/or other media.

EXAMPLES

Illustrative examples of the technologies disclosed herein are provided below. An embodiment of the technologies may include any one or more, and any combination of, the examples described below.

Example 1 includes a network switch for using fabric supported sequencers in a fabric architecture in which the network switch is communicatively coupled to a plurality of computing nodes of the fabric architecture, the network switch comprising a processor; and one or more data storage devices having stored therein a plurality of instructions that, when executed by the processor, cause the network switch to receive an sequencer access message from a computing node of the plurality of computing nodes, wherein the sequencer access message includes an identifier of a sequencing counter corresponding to a sequencer session and one or more operation parameters; perform an operation on a value associated with the identifier of the sequencing counter as a function of the one or more operation parameters, wherein the value is stored local to the network switch; increment the identifier of the sequencing counter; associate a result of the operation with the incremented identifier of the sequencing counter; and transmit an acknowledgment of successful access to the computing node, wherein the acknowledgment of successful access includes the result of the operation and the incremented identifier of the sequencing counter.

Example 2 includes the subject matter of Example 1, and wherein the identifier of the sequencing counter corresponds to one of a plurality of sequencing counters previously assigned to a master computing node of the plurality of computing nodes by the network switch during setup of the sequencer session.

Example 3 includes the subject matter of any of Examples 1 and 2, and wherein the sequencer access message additionally includes an identifier of a target network switch usable by the network switch to determine whether the network switch corresponds to the target network switch responsible for managing the sequencing counter associated with the identifier of the sequencing counter of the sequencer access message.

Example 4 includes the subject matter of any of Examples 1-3, and wherein the one or more operation parameters includes one or more of an operation indicator and an operand value.

Example 5 includes the subject matter of any of Examples 1-4, and wherein the operation indicator comprises one of a mathematical symbol or a mutator method.

Example 6 includes the subject matter of any of Examples 1-5, and wherein the plurality of instructions further cause the network switch to receive a sequencer initialization message from a master computing node of the plurality of computing nodes; assign, upon having received the sequencer initialization message, the identifier of the sequencing counter to the master computing node; and transmit an acknowledgment of successful sequencer session initialization to the master computing node, wherein the acknowledgment of successful sequencer session initialization includes the assigned identifier of the sequencing counter.

Example 7 includes the subject matter of any of Examples 1-6, and wherein the plurality of instructions further cause the network switch to set, upon assignment of the identifier of the sequencing counter to the master computing node, a value associated with the sequencing counter to zero.

Example 8 includes the subject matter of any of Examples 1-7, and wherein the sequencer initialization message includes an identifier of a target network switch, and wherein the plurality of instructions further cause the network switch to determine whether the network switch corresponds to the target network switch responsible for managing the sequencing counter associated with the identifier of the sequencing counter of the sequencer access message.

Example 9 includes the subject matter of any of Examples 1-8, and wherein the plurality of instructions further cause the network switch to receive, subsequent to having transmitted the acknowledgment of successful sequencer session initialization to the master computing node, a sequencer group notification from the master computing node, wherein the sequencer group notification includes the identifier of the sequencing counter and one or more computing node identifiers corresponding to one or more other computing nodes of the plurality of computing nodes to be assigned to a sequencer group.

Example 10 includes the subject matter of any of Examples 1-9, and wherein the plurality of instructions further cause the network switch to transmit a notification of sequencer group assignment to each of the computing nodes to be assigned to the sequencer group, wherein the notification of sequencer group assignment includes the result of the operation and the incremented identifier of the sequencing counter to the one or more other computing nodes.

Example 11 includes the subject matter of any of Examples 1-10, and wherein the plurality of instructions further cause the network switch to receive a sequencer session termination message from the master computing node, wherein the sequencer session termination message includes the identifier of the sequencing counter corresponding to the sequencer session; free the sequencing counter based on the identifier of the sequencing counter; and transmit an acknowledgment of successful termination to the master computing node.

Example 12 includes a network switch for using fabric supported sequencers in a fabric architecture in which the network switch is communicatively coupled to a plurality of computing nodes of the fabric architecture, the network switch comprising a communication management circuit to receive an sequencer access message from a computing node of the plurality of computing nodes, wherein the sequencer access message includes an identifier of a sequencing counter corresponding to a sequencer session and one or more operation parameters; and a sequencer management circuit to perform an operation on a value associated with the identifier of the sequencing counter as a function of the one or more operation parameters, wherein the value is stored local to the network switch; increment the identifier of the sequencing counter; and associate a result of the operation with the incremented identifier of the sequencing counter, wherein the communication management circuit is further to transmit an acknowledgment of successful access to the computing node, wherein the acknowledgment of successful access includes the result of the operation and the incremented identifier of the sequencing counter.

Example 13 includes the subject matter of Example 12, and wherein the identifier of the sequencing counter corresponds to one of a plurality of sequencing counters previously assigned to a master computing node of the plurality of computing nodes by the network switch during setup of the sequencer session.

Example 14 includes the subject matter of any of Examples 12 and 13, and wherein the sequencer access message additionally includes an identifier of a target network switch usable by the network switch to determine whether the network switch corresponds to the target network switch responsible for managing the sequencing counter associated with the identifier of the sequencing counter of the sequencer access message.

Example 15 includes the subject matter of any of Examples 12-14, and wherein the one or more operation parameters includes one or more of an operation indicator and an operand value.

Example 16 includes the subject matter of any of Examples 12-15, and wherein the operation indicator comprises one of a mathematical symbol or a mutator method.

Example 17 includes the subject matter of any of Examples 12-16, and wherein the communication management circuit is further to receive a sequencer initialization message from a master computing node of the plurality of computing nodes, wherein the sequencer management circuit is further to assign, upon having received the sequencer initialization message, the identifier of the sequencing counter to the master computing node, wherein the communication management circuit is further to transmit an acknowledgment of successful sequencer session initialization to the master computing node, and wherein the acknowledgment of successful sequencer session initialization includes the assigned identifier of the sequencing counter.

Example 18 includes the subject matter of any of Examples 12-17, and wherein the sequencer management circuit is further to set, upon assignment of the identifier of the sequencing counter to the master computing node, a value associated with the sequencing counter to zero.

Example 19 includes the subject matter of any of Examples 12-18, and wherein the sequencer initialization message includes an identifier of a target network switch, and wherein the sequencer management circuit is further to determine whether the network switch corresponds to the target network switch responsible for managing the sequencing counter associated with the identifier of the sequencing counter of the sequencer access message.

Example 20 includes the subject matter of any of Examples 12-19, and wherein the communication management circuit is further to receive, subsequent to having transmitted the acknowledgment of successful sequencer session initialization to the master computing node, a sequencer group notification from the master computing node, wherein the sequencer group notification includes the identifier of the sequencing counter and one or more computing node identifiers corresponding to one or more other computing nodes of the plurality of computing nodes to be assigned to a sequencer group.

Example 21 includes the subject matter of any of Examples 12-20, and wherein the communication management circuit is further to transmit a notification of sequencer group assignment to each of the computing nodes to be assigned to the sequencer group, wherein the notification of sequencer group assignment includes the result of the operation and the incremented identifier of the sequencing counter to the one or more other computing nodes.

Example 22 includes the subject matter of any of Examples 12-21, and wherein the communication management circuit is further to receive a sequencer session termination message from the master computing node, wherein the sequencer session termination message includes the identifier of the sequencing counter corresponding to the sequencer session, wherein the sequencer management circuit is further to free the sequencing counter based on the identifier of the sequencing counter, and wherein the communication management circuit is further to transmit an acknowledgment of successful termination to the master computing node.

Example 23 includes a method for using fabric supported sequencers in a fabric architecture that includes a network switch communicatively coupled to a plurality of computing nodes, the method comprising receiving, by the network switch, an sequencer access message from a computing node of the plurality of computing nodes, wherein the sequencer access message includes an identifier of a sequencing counter corresponding to a sequencer session and one or more operation parameters; performing, by the network switch, an operation on a value associated with the identifier of the sequencing counter as a function of the one or more operation parameters, wherein the value is stored local to the network switch; incrementing, by the network switch, the identifier of the sequencing counter; associating, by the network switch, a result of the operation with the incremented identifier of the sequencing counter; and transmitting, by the network switch, an acknowledgment of successful access to the computing node, wherein the acknowledgment of successful access includes the result of the operation and the incremented identifier of the sequencing counter.

Example 24 includes the subject matter of Example 23, and wherein receiving the identifier of the sequencing counter with the sequencer access message comprises receiving the identifier of the sequencing counter that corresponds to one of a plurality of sequencing counters previously assigned to a master computing node of the plurality of computing nodes by the network switch during setup of the sequencer session.

Example 25 includes the subject matter of any of Examples 23 and 24, and wherein receiving the sequencer access message additionally comprises receiving an identifier of a target network switch usable by the network switch to determine whether the network switch corresponds to the target network switch responsible for managing the sequencing counter associated with the identifier of the sequencing counter of the sequencer access message.

Example 26 includes the subject matter of any of Examples 23-25, and wherein receiving the one or more operation parameters with the sequencer access message comprises receiving one or more of an operation indicator and an operand value with the sequencer access message.

Example 27 includes the subject matter of any of Examples 23-26, and wherein receiving the operation indicator comprises receiving one of mathematical symbol or a mutator method.

Example 28 includes the subject matter of any of Examples 23-27, and further including receiving, by the network switch, a sequencer initialization message from a master computing node of the plurality of computing nodes; assigning, by the network switch and upon having received the sequencer initialization message, the identifier of the sequencing counter to the master computing node; and transmitting, by the network switch, an acknowledgment of successful sequencer session initialization to the master computing node, wherein the acknowledgment of successful sequencer session initialization includes the assigned identifier of the sequencing counter.

Example 29 includes the subject matter of any of Examples 23-28, and further including setting, by the network switch and upon assignment of the identifier of the sequencing counter to the master computing node, a value associated with the sequencing counter to zero.

Example 30 includes the subject matter of any of Examples 23-29, and wherein the sequencer initialization message includes an identifier of a target network switch, and further comprising determining, by the network switch, whether the network switch corresponds to the target network switch responsible for managing the sequencing counter associated with the identifier of the sequencing counter of the sequencer access message.

Example 31 includes the subject matter of any of Examples 23-30, and further including receiving, by the network switch and subsequent to having transmitted the acknowledgment of successful sequencer session initialization to the master computing node, a sequencer group notification from the master computing node, wherein the sequencer group notification includes the identifier of the sequencing counter and one or more computing node identifiers corresponding to one or more other computing nodes of the plurality of computing nodes to be assigned to a sequencer group.

Example 32 includes the subject matter of any of Examples 23-31, and further including transmitting, by the network switch, a notification of sequencer group assignment to each of the computing nodes to be assigned to the sequencer group, wherein the notification of sequencer group assignment includes the result of the operation and the incremented identifier of the sequencing counter to the one or more other computing nodes.

Example 33 includes the subject matter of any of Examples 23-32, and further including receiving, by the network switch, a sequencer session termination message from the master computing node, wherein the sequencer session termination message includes the identifier of the sequencing counter corresponding to the sequencer session; freeing, by the network switch, the sequencing counter based on the identifier of the sequencing counter; and transmitting, by the network switch, an acknowledgment of successful termination to the master computing node.

Example 34 includes a network switch comprising a processor; and a memory having stored therein a plurality of instructions that when executed by the processor cause the network switch to perform the method of any of Examples 23-33.

Example 35 includes one or more machine readable storage media comprising a plurality of instructions stored thereon that in response to being executed result in a network switch performing the method of any of Examples 23-33.

Example 36 includes a network switch for using fabric supported sequencers in a fabric architecture in which the network switch is communicatively coupled to a plurality of computing nodes of the fabric architecture, the network switch comprising a communication management circuit to receive an sequencer access message from a computing node of the plurality of computing nodes, wherein the sequencer access message includes an identifier of a sequencing counter corresponding to a sequencer session and one or more operation parameters; means for performing an operation on a value associated with the identifier of the sequencing counter as a function of the one or more operation parameters, wherein the value is stored local to the network switch; means for incrementing the identifier of the sequencing counter; and means for associating a result of the operation with the incremented identifier of the sequencing counter, wherein the communication management circuit is further to transmit an acknowledgment of successful access to the computing node, wherein the acknowledgment of successful access includes the result of the operation and the incremented identifier of the sequencing counter.

Example 37 includes the subject matter of Example 36, and wherein the identifier of the sequencing counter corresponds to one of a plurality of sequencing counters previously assigned to a master computing node of the plurality of computing nodes by the network switch during setup of the sequencer session.

Example 38 includes the subject matter of any of Examples 36 and 37, and wherein the sequencer access message additionally includes an identifier of a target network switch usable by the network switch to determine whether the network switch corresponds to the target network switch responsible for managing the sequencing counter associated with the identifier of the sequencing counter of the sequencer access message.

Example 39 includes the subject matter of any of Examples 36-38, and wherein the one or more operation parameters includes one or more of an operation indicator and an operand value.

Example 40 includes the subject matter of any of Examples 36-39, and wherein the operation indicator comprises one of a mathematical symbol or a mutator method.

Example 41 includes the subject matter of any of Examples 36-40, and wherein the communication management circuit is further to receive a sequencer initialization message from a master computing node of the plurality of computing nodes; further comprising means for assigning, upon having received the sequencer initialization message, the identifier of the sequencing counter to the master computing node, wherein the communication management circuit is further to transmit an acknowledgment of successful sequencer session initialization to the master computing node, and wherein the acknowledgment of successful sequencer session initialization includes the assigned identifier of the sequencing counter.

Example 42 includes the subject matter of any of Examples 36-41, and further including means for setting, upon assignment of the identifier of the sequencing counter to the master computing node, a value associated with the sequencing counter to zero.

Example 43 includes the subject matter of any of Examples 36-42, and wherein the sequencer initialization message includes an identifier of a target network switch; and further comprising means for determining whether the network switch corresponds to the target network switch responsible for managing the sequencing counter associated with the identifier of the sequencing counter of the sequencer access message.

Example 44 includes the subject matter of any of Examples 36-43, and wherein the communication management circuit is further to receive, subsequent to having transmitted the acknowledgment of successful sequencer session initialization to the master computing node, a sequencer group notification from the master computing node, wherein the sequencer group notification includes the identifier of the sequencing counter and one or more computing node identifiers corresponding to one or more other computing nodes of the plurality of computing nodes to be assigned to a sequencer group.

Example 45 includes the subject matter of any of Examples 36-44, and wherein the communication management circuit is further to transmit a notification of sequencer group assignment to each of the computing nodes to be assigned to the sequencer group, wherein the notification of sequencer group assignment includes the result of the operation and the incremented identifier of the sequencing counter to the one or more other computing nodes.

Example 46 includes the subject matter of any of Examples 36-45, and wherein the communication management circuit is further to receive a sequencer session termination message from the master computing node, wherein the sequencer session termination message includes the identifier of the sequencing counter corresponding to the sequencer session, further comprising means for freeing the sequencing counter based on the identifier of the sequencing counter, and wherein the communication management circuit is further to transmit an acknowledgment of successful termination to the master computing node.

The invention claimed is:

1. A network switch for using fabric supported sequencers in a fabric architecture in which the network switch is communicatively coupled to a plurality of computing nodes of the fabric architecture, the network switch comprising:
a processor; and
one or more data storage devices having stored therein a plurality of instructions that, when executed by the processor, cause the network switch to:
receive an sequencer access message from a computing node of the plurality of computing nodes, wherein the sequencer access message includes an identifier of a sequencing counter corresponding to a sequencer session and one or more operation parameters;
perform an operation on a value associated with the identifier of the sequencing counter as a function of the one or more operation parameters, wherein the value is stored local to the network switch;
increment the identifier of the sequencing counter;
associate a result of the operation with the incremented identifier of the sequencing counter; and
transmit an acknowledgment of successful access to the computing node, wherein the acknowledgment of successful access includes the result of the operation and the incremented identifier of the sequencing counter.

2. The network switch of claim 1, wherein the identifier of the sequencing counter corresponds to one of a plurality of sequencing counters previously assigned to a master computing node of the plurality of computing nodes by the network switch during setup of the sequencer session.

3. The network switch of claim 1, wherein the sequencer access message additionally includes an identifier of a target network switch usable by the network switch to determine whether the network switch corresponds to the target network switch responsible for managing the sequencing counter associated with the identifier of the sequencing counter of the sequencer access message.

4. The network switch of claim 1, wherein the one or more operation parameters includes one or more of an operation indicator and an operand value.

5. The network switch of claim 4, wherein the operation indicator comprises one of a mathematical symbol or a mutator method.

6. The network switch of claim 1, wherein the plurality of instructions further cause the network switch to:
receive a sequencer initialization message from a master computing node of the plurality of computing nodes;
assign, upon having received the sequencer initialization message, the identifier of the sequencing counter to the master computing node; and
transmit an acknowledgment of successful sequencer session initialization to the master computing node, wherein the acknowledgment of successful sequencer session initialization includes the assigned identifier of the sequencing counter.

7. The network switch of claim 6, wherein the plurality of instructions further cause the network switch to set, upon assignment of the identifier of the sequencing counter to the master computing node, a value associated with the sequencing counter to zero.

8. The network switch of claim 6, wherein the sequencer initialization message includes an identifier of a target network switch, and
wherein the plurality of instructions further cause the network switch to determine whether the network switch corresponds to the target network switch responsible for managing the sequencing counter associated with the identifier of the sequencing counter of the sequencer access message.

9. The network switch of claim 6, wherein the plurality of instructions further cause the network switch to receive, subsequent to having transmitted the acknowledgment of successful sequencer session initialization to the master computing node, a sequencer group notification from the master computing node, wherein the sequencer group notification includes the identifier of the sequencing counter and one or more computing node identifiers corresponding to one or more other computing nodes of the plurality of computing nodes to be assigned to a sequencer group.

10. The network switch of claim 9, wherein the plurality of instructions further cause the network switch to transmit a notification of sequencer group assignment to each of the computing nodes to be assigned to the sequencer group, wherein the notification of sequencer group assignment includes the result of the operation and the incremented identifier of the sequencing counter to the one or more other computing nodes.

11. The network switch of claim 6, wherein the plurality of instructions further cause the network switch to:
receive a sequencer session termination message from the master computing node, wherein the sequencer session termination message includes the identifier of the sequencing counter corresponding to the sequencer session;
free the sequencing counter based on the identifier of the sequencing counter; and transmit an acknowledgment of successful termination to the master computing node.

12. One or more non-transitory computer-readable storage media comprising a plurality of instructions stored thereon that in response to being executed cause a network switch to:
receive an sequencer access message from a computing node of the plurality of computing nodes, wherein the sequencer access message includes an identifier of a sequencing counter corresponding to a sequencer session and one or more operation parameters;
perform an operation on a value associated with the identifier of the sequencing counter as a function of the one or more operation parameters, wherein the value is stored local to the network switch;
increment the identifier of the sequencing counter;
associate a result of the operation with the incremented identifier of the sequencing counter; and
transmit an acknowledgment of successful access to the computing node, wherein the acknowledgment of successful access includes the result of the operation and the incremented identifier of the sequencing counter.

13. The one or more non-transitory computer-readable storage media of claim 12, wherein the identifier of the sequencing counter corresponds to one of a plurality of sequencing counters previously assigned to a master computing node of the plurality of computing nodes by the network switch during setup of the sequencer session.

14. The one or more non-transitory computer-readable storage media of claim 12, wherein the sequencer access message additionally includes an identifier of a target network switch usable by the network switch to determine whether the network switch corresponds to the target network switch responsible for managing the sequencing counter associated with the identifier of the sequencing counter of the sequencer access message.

15. The one or more non-transitory computer-readable storage media of claim 12, wherein the one or more operation parameters includes one or more of an operation indicator and an operand value.

16. The one or more non-transitory computer-readable storage media of claim 15, wherein the operation indicator comprises one of a mathematical symbol or a mutator method.

17. The one or more non-transitory computer-readable storage media of claim 12, wherein the plurality of instructions further cause the network switch to:
receive a sequencer initialization message from a master computing node of the plurality of computing nodes;
assign, upon having received the sequencer initialization message, the identifier of the sequencing counter to the master computing node; and
transmit an acknowledgment of successful sequencer session initialization to the master computing node, wherein the acknowledgment of successful sequencer session initialization includes the assigned identifier of the sequencing counter.

18. The one or more non-transitory computer-readable storage media of claim 17, wherein the plurality of instructions further cause the network switch to set, upon assignment of the identifier of the sequencing counter to the master computing node, a value associated with the sequencing counter to zero.

19. The one or more non-transitory computer-readable storage media of claim 17, wherein the sequencer initialization message includes an identifier of a target network switch, and wherein the plurality of instructions further cause the network switch to determine whether the network switch corresponds to the target network switch responsible for managing the sequencing counter associated with the identifier of the sequencing counter of the sequencer access message.

20. The one or more non-transitory computer-readable storage media of claim 17, wherein the plurality of instructions further cause the network switch to receive, subsequent to having transmitted the acknowledgment of successful sequencer session initialization to the master computing node, a sequencer group notification from the master computing node, wherein the sequencer group notification includes the identifier of the sequencing counter and one or more computing node identifiers corresponding to one or more other computing nodes of the plurality of computing nodes to be assigned to a sequencer group.

21. The one or more non-transitory computer-readable storage media of claim 20, wherein the plurality of instructions further cause the network switch to transmit a notification of sequencer group assignment to each of the computing nodes to be assigned to the sequencer group, wherein the notification of sequencer group assignment includes the result of the operation and the incremented identifier of the sequencing counter to the one or more other computing nodes.

22. The one or more non-transitory computer-readable storage media of claim 17, wherein the plurality of instructions further cause the network switch to:
receive a sequencer session termination message from the master computing node, wherein the sequencer session termination message includes the identifier of the sequencing counter corresponding to the sequencer session;
free the sequencing counter based on the identifier of the sequencing counter; and
transmit an acknowledgment of successful termination to the master computing node.

23. A network switch for using fabric supported sequencers in a fabric architecture in which the network switch is communicatively coupled to a plurality of computing nodes of the fabric architecture, the network switch comprising:
a communication management circuit to receive an sequencer access message from a computing node of the plurality of computing nodes, wherein the sequencer access message includes an identifier of a sequencing counter corresponding to a sequencer session and one or more operation parameters;
means for performing an operation on a value associated with the identifier of the sequencing counter as a function of the one or more operation parameters, wherein the value is stored local to the network switch;
means for incrementing the identifier of the sequencing counter; and
means for associating a result of the operation with the incremented identifier of the sequencing counter,
wherein the communication management circuit is further to transmit an acknowledgment of successful access to the computing node, wherein the acknowledgment of successful access includes the result of the operation and the incremented identifier of the sequencing counter.

24. The network switch of claim 23, wherein the communication management circuit is further to receive a sequencer initialization message from a master computing node of the plurality of computing nodes;

further comprising means for assigning, upon having received the sequencer initialization message, the identifier of the sequencing counter to the master computing node, wherein the communication management circuit is further to transmit an acknowledgment of successful sequencer session initialization to the master computing node, and wherein the acknowledgment of successful sequencer session initialization includes the assigned identifier of the sequencing counter.

25. The network switch of claim 24, wherein the communication management circuit is further to receive a sequencer session termination message from the master computing node, wherein the sequencer session termination message includes the identifier of the sequencing counter corresponding to the sequencer session, further comprising means for freeing the sequencing counter based on the identifier of the sequencing counter, and wherein the communication management circuit is further to transmit an acknowledgment of successful termination to the master computing node.

\* \* \* \* \*